(12) United States Patent
Burt et al.

(10) Patent No.: US 11,633,018 B2
(45) Date of Patent: Apr. 25, 2023

(54) LATCHING SYSTEM FOR A ROTARY CLOSURE

(71) Applicant: Pride Manufacturing Company, LLC, Brentwood, TN (US)

(72) Inventors: John Robert Burt, Brentwood, TN (US); Lee Paul Shuttleworth, Brentwood, TN (US)

(73) Assignee: Pride Manufacturing Company, LLC, Brentwood, TN (US)

( * ) Notice: Subject to any disclaimer, the term of this patent is extended or adjusted under 35 U.S.C. 154(b) by 769 days.

(21) Appl. No.: 16/667,709

(22) Filed: Oct. 29, 2019

(65) Prior Publication Data

US 2020/0128919 A1    Apr. 30, 2020

Related U.S. Application Data

(60) Provisional application No. 62/752,338, filed on Oct. 29, 2018.

(51) Int. Cl.
| | |
|---|---|
| *A43C 11/16* | (2006.01) |
| *E05C 3/14* | (2006.01) |
| *E05C 3/12* | (2006.01) |
| *F16D 3/52* | (2006.01) |
| *F16D 23/12* | (2006.01) |

(52) U.S. Cl.
CPC ............ *A43C 11/165* (2013.01); *E05C 3/122* (2013.01); *E05C 3/145* (2013.01); *F16D 3/52* (2013.01); *F16D 2023/123* (2013.01)

(58) Field of Classification Search
CPC ......... A43C 11/165; E05C 3/122; F16D 3/52; F16D 2023/123
See application file for complete search history.

(56) References Cited

U.S. PATENT DOCUMENTS

| | | | | |
|---|---|---|---|---|
| 9,072,341 | B2 * | 7/2015 | Jungkind | A43C 11/165 |
| 2011/0303782 | A1 * | 12/2011 | Hu | A43C 11/20 |
| | | | | 242/388 |
| 2014/0359981 | A1 * | 12/2014 | Cotterman | A43C 11/20 |
| | | | | 24/712.9 |
| 2017/0325548 | A1 * | 11/2017 | Ha | A43C 11/165 |
| 2018/0132567 | A1 * | 5/2018 | Lee | A43C 11/20 |
| 2018/0160775 | A1 * | 6/2018 | Pollack | A43C 7/00 |
| 2019/0000187 | A1 * | 1/2019 | Chen | A43C 7/00 |
| 2019/0144150 | A1 * | 5/2019 | Chen | A43C 11/165 |
| | | | | 100/32 |
| 2020/0346888 | A1 * | 11/2020 | Kruse | F16G 11/12 |

* cited by examiner

*Primary Examiner* — Robert Sandy
*Assistant Examiner* — Rowland Do
(74) *Attorney, Agent, or Firm* — Polsinelli PC

(57) ABSTRACT

A latching system used for a rotary closure of a shoe.

10 Claims, 40 Drawing Sheets

LATCHING SYSTEM FOR A ROTARY CLOSURE

CROSS REFERENCE TO RELATED APPLICATIONS

This is a non-provisional application that claims benefit from U.S. provisional application Ser. No. 62/752,338 filed on Oct. 29, 2018, which is herein incorporated by reference in its entirety.

FIELD

The present disclosure generally relates to a latching system for latching together components of an apparatus, and in particular to methods and systems for latching together the various components of a rotary closure for a shoe.

BACKGROUND

A rotary closure system for a shoe, especially for a sports shoe, may include a housing which can be attached to the shoe, a tensioning roller which is rotatably supported around the axis of the housing, wherein a tensioning element can be spooled during lacing of the shoe on the tensioning roller element, and a rotary knob which is arranged rotatably around the axis at the housing to turn the tensioning roller for tightening the lacing of the shoe.

A typical rotary closure system functions to lace a shoe by first lacing the tensioning element (lace thread or wire) by rotation of the rotary knob with low torque while maintaining high tension. On the other hand, an easy slacking of the tensioning element for loosening the lace should also be possible when the shoe needs to be taken off again.

It is detrimental that the above requirements of these conventional rotary closure systems cannot be fulfilled collectively without problems. For example, rotary closure systems which fulfill the mechanical requirements of lacing a shoe are often designed so complex that an expensive production with relatively many parts is a given such that assembly of these various components can be difficult and time consuming during manufacturing. As such, latching the components of the rotary closure together during assembly can be complex and expensive.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
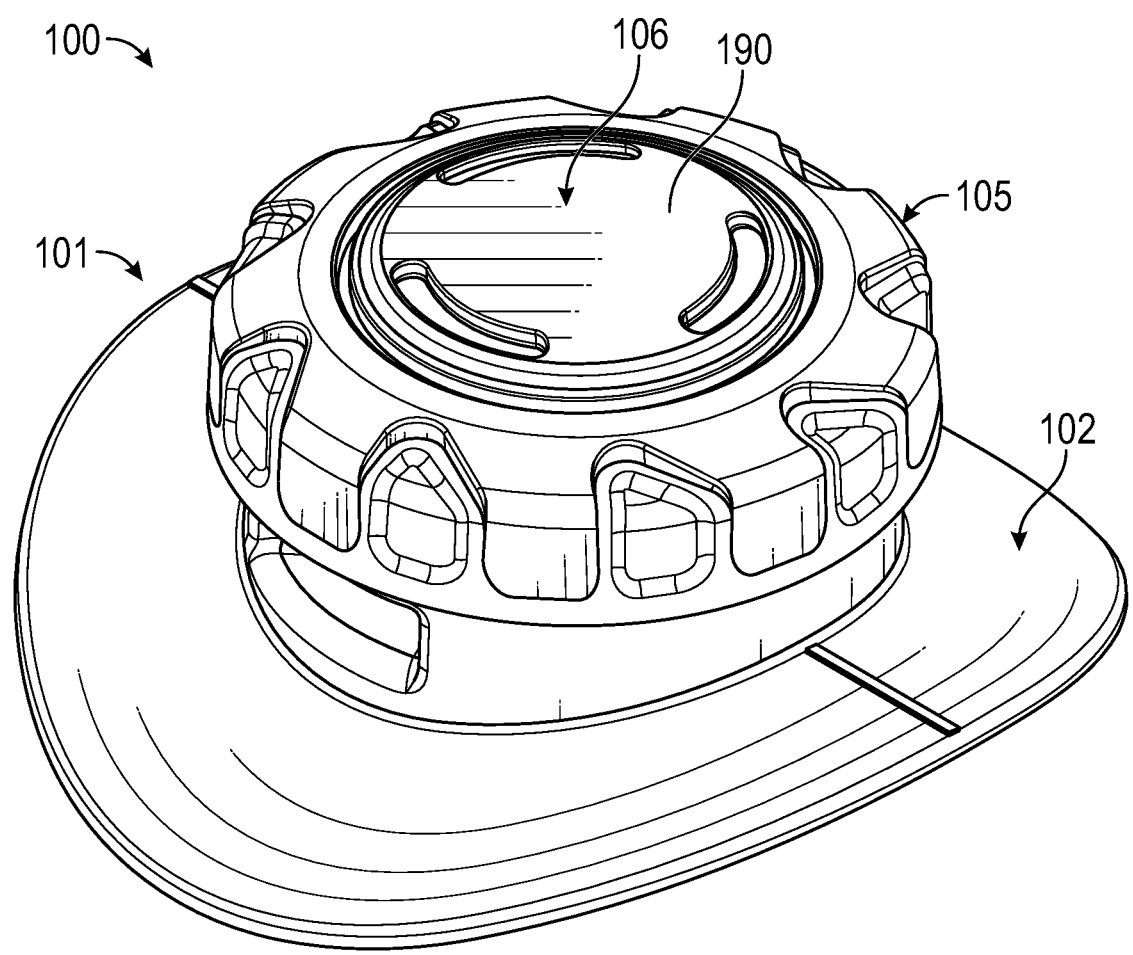
FIG. 1 is a perspective view of a first embodiment of a rotary closure having a latching system for latching together components of the rotary closure.

Various embodiments of a rotary closure having a latching system including a turnkey inserted through a plurality of aligned keyways to latch various components of the rotary closure together during assembly are disclosed. In some embodiments, the latching system includes a turnkey configured to be inserted through the plurality of axially aligned keyways formed by respective keyways of a dial, a snap spring assembly, a spool and a distal-most component until a tab of the turnkey engages a distal-most keyway of the distal-most component and is rotated 180 degrees such that the turnkey assumes a latched position and the components of the rotary closure are latched together. In some embodiments, the distal-most keyway of the latching system defines a ramp in communication with a pocket such that rotation of the turnkey causes the singular laterally extending tab of the turnkey to ride over the ramp and snap into place within the pocket of the distal-most keyway to assume a latched position and prevent unlatching of the components of the rotary closure. In one aspect, the arrangement of the ramp and pocket formed by the distal-most keyway prevents inadvertent rotation of the turnkey from the latched position when seated within the pocket of the distal-most keyway. In some embodiments, the tab defines a footprint that is substantially similar or identical to the configuration of each keyway of each respective component of the rotary closure.

In a second embodiment of the rotary closure, the latching system may include a turnkey defining a tab laterally extending in two opposing directions configured to be inserted through a plurality of axially aligned keyways of a dial, a snap spring assembly, a spool and a distal-most component until the turnkey element engages a distal-most keyway and is then rotated such that the tab assumes a latched position. In this embodiment, a clip may reside in a clip recess defined by the distal-most keyway. When rotated 90 degrees, the tab may ride over the clip, thereby securing the turnkey element in the latched position. In one aspect, the arrangement of the clip and clip recess defined by the distal-most keyway prevents inadvertent rotation of the turnkey from the latched position. In one aspect, rotation of the turnkey in a 90 degree rotation causes the aligned components of the rotary closure to assume a latched position, while rotation of the turnkey in an opposite direction causes the aligned components of the rotary closure to assume an unlatched position.

Referring to the drawings, embodiments of a rotary closure having a latching system are illustrated and generally indicated as 100 in FIGS. 1-34 and 200 in FIGS. 35-73.

Figure 2:
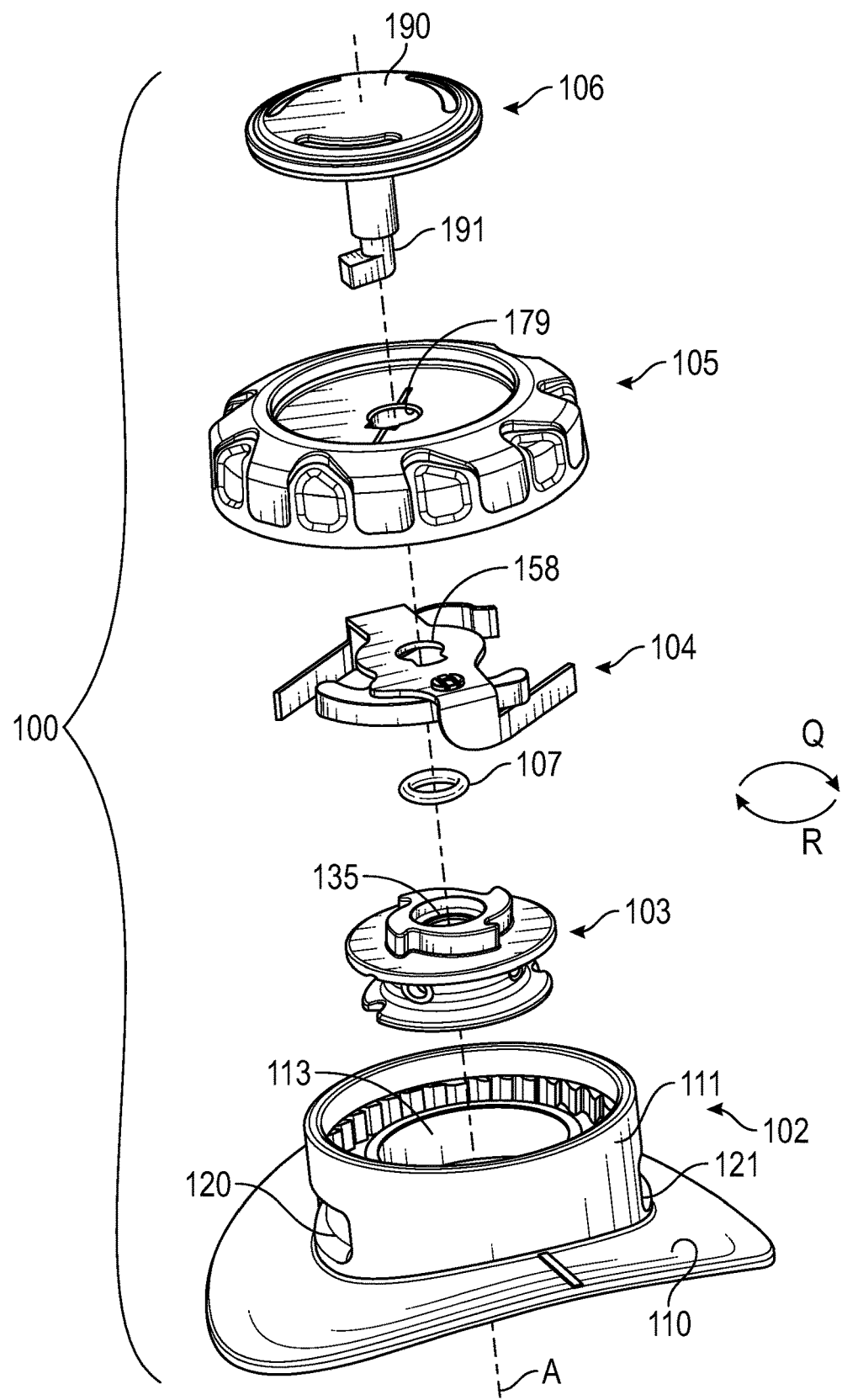
FIG. 2 is an exploded view of the rotary closure of FIG. 1.
Figure 3:
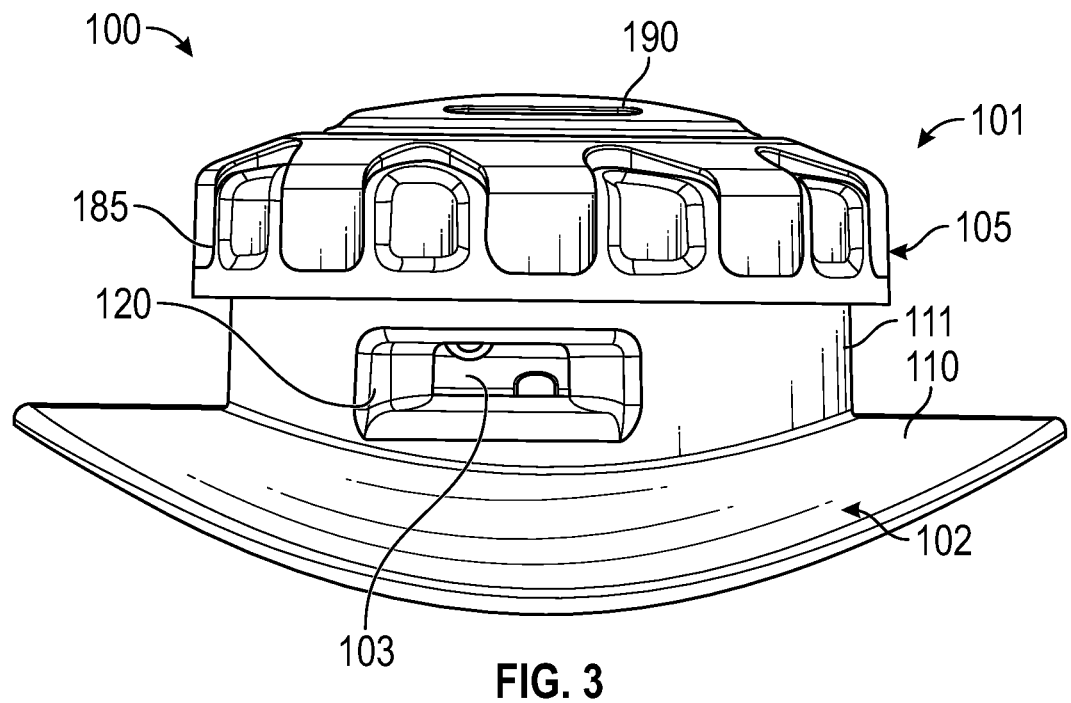
FIG. 3 is a front view of the rotary closure of FIG. 1.
Figure 4:
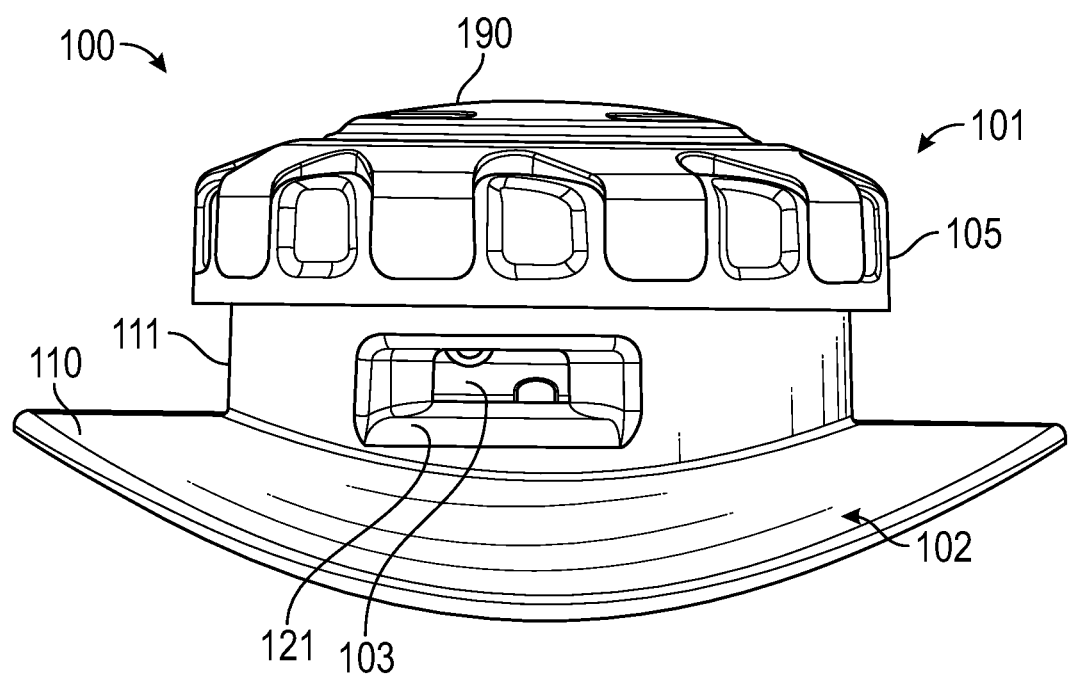
FIG. 4 is a rear view of the rotary closure of FIG. 1.
Figure 5:
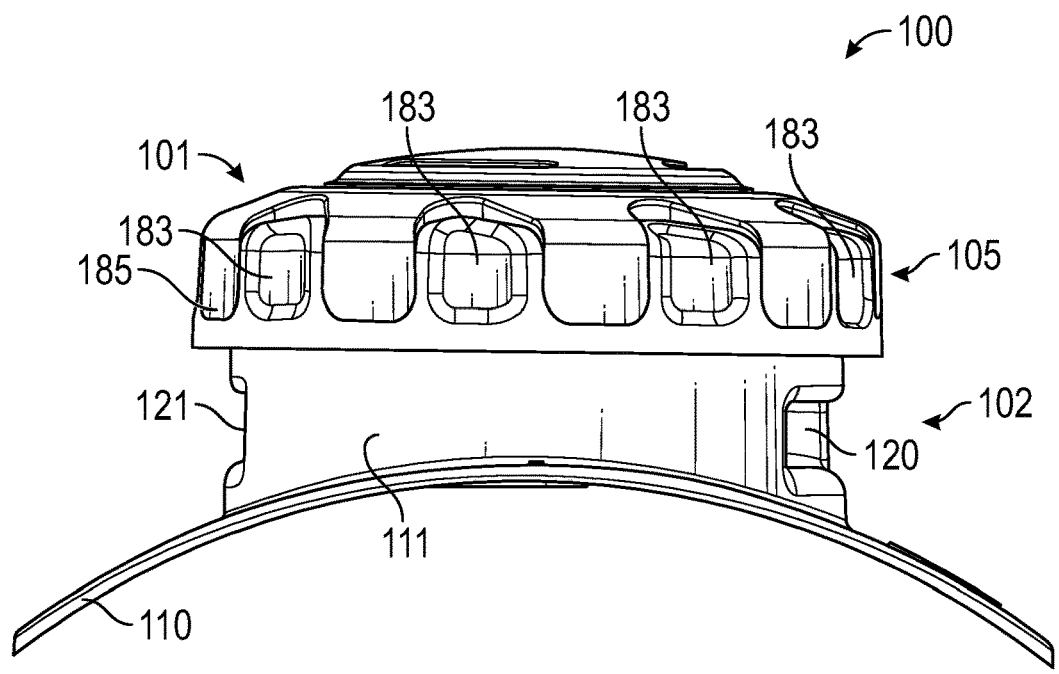
FIG. 5 is a side view of the rotary closure of FIG. 1.
Figure 6:
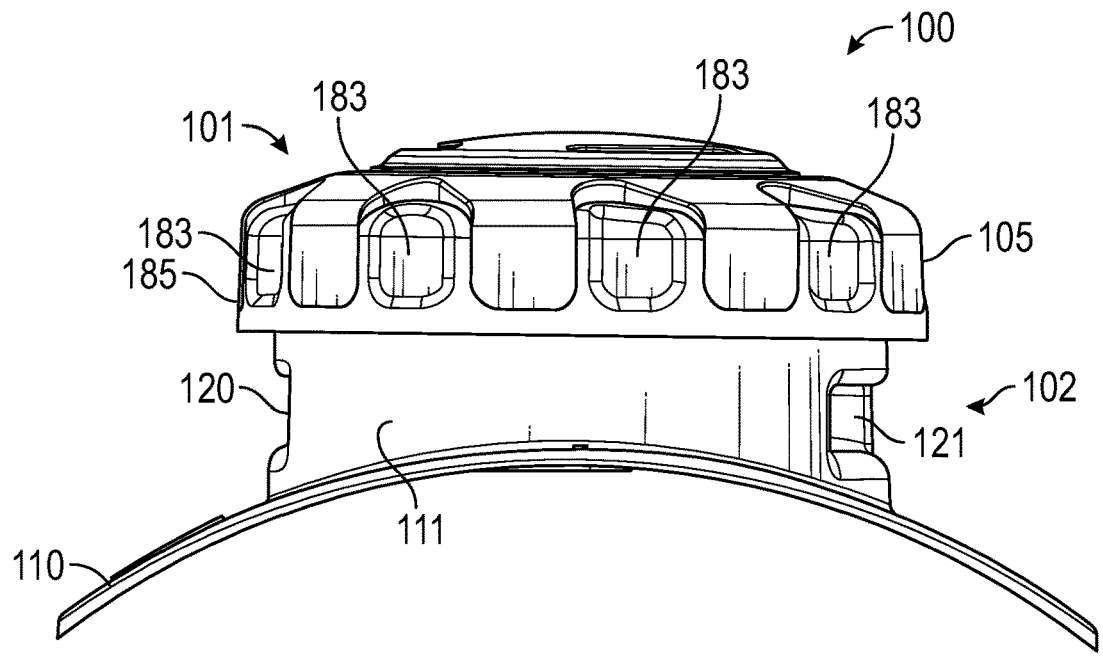
FIG. 6 is an opposite side view of the rotary closure of FIG. 1.

FIGS. 1-8 illustrate the rotary closure 100 in an assembled state with a latching system 101 maintaining the components of the rotary closure 100 in a latched position such that the components of the rotary closure 100 are secured together in an assembled state. FIG. 1 in particular illustrates a perspective view of the rotary closure 100 having a distal-most component 102 and a dial 105, wherein other components of the rotary closure are disposed within an enclosure defined by the distal-most component 102 and the dial 105. In most embodiments, the distal-most component 102 is a housing 102 located farthest away from the dial 105. FIGS. 1 and 2 further illustrate a turnkey 106 used to latch together the components of the rotary closure 100 together. In some embodiments, the turnkey 106 includes a cover element 190 and a turnkey element 191 that extends axially from the cover element 190.

FIG. 2 illustrates an exploded view of the rotary closure 100 having a spool 103 disposed within the housing 102 and a snap spring assembly 104 in operative engagement with the spool 103. As further shown in FIG. 2, the housing 102 defines a distal-most keyway 113 (referred to herein as a housing keyway 113), the spool 103 defines a spool keyway 135, the snap spring assembly defines a snap spring keyway 158, and the dial 105 defines a dial keyway 179. During operation, the dial 105, the snap spring assembly 104, the spool 103 and the housing 102 are oriented such that the dial keyway 179, the snap spring keyway 158, the spool keyway 135 and the housing keyway 113 are aligned along a vertical axis A. Once the dial keyway 179, the snap spring keyway 158, the spool keyway 103 and the housing keyway 113 are aligned, the turnkey 106 is inserted through the dial keyway 179, the snap spring keyway 158, the spool keyway 135 and the housing keyway 113 in order to secure the housing 102, the spool 103, the snap spring assembly 104, and the dial 105 together in the assembled state shown in FIG. 1. In some embodiments, a sealing element 107 is included to aid with the engagement of the spool 103 with the snap spring assembly 104. Furthermore, the dial 105 is operatively engaged with the snap spring assembly 104 to allow for incremental rotation of the dial 105 in a clockwise or counterclockwise direction Q only, while preventing rotation of the dial 105 in an opposite clockwise or counterclockwise direction R. In this manner, the spool 103 is engaged with the snap spring assembly 104 and the dial 104 and the spool 103 and the snap spring assembly 104 are disposed within the enclosure formed by the dial 104 and the housing 102.

Figure 7:
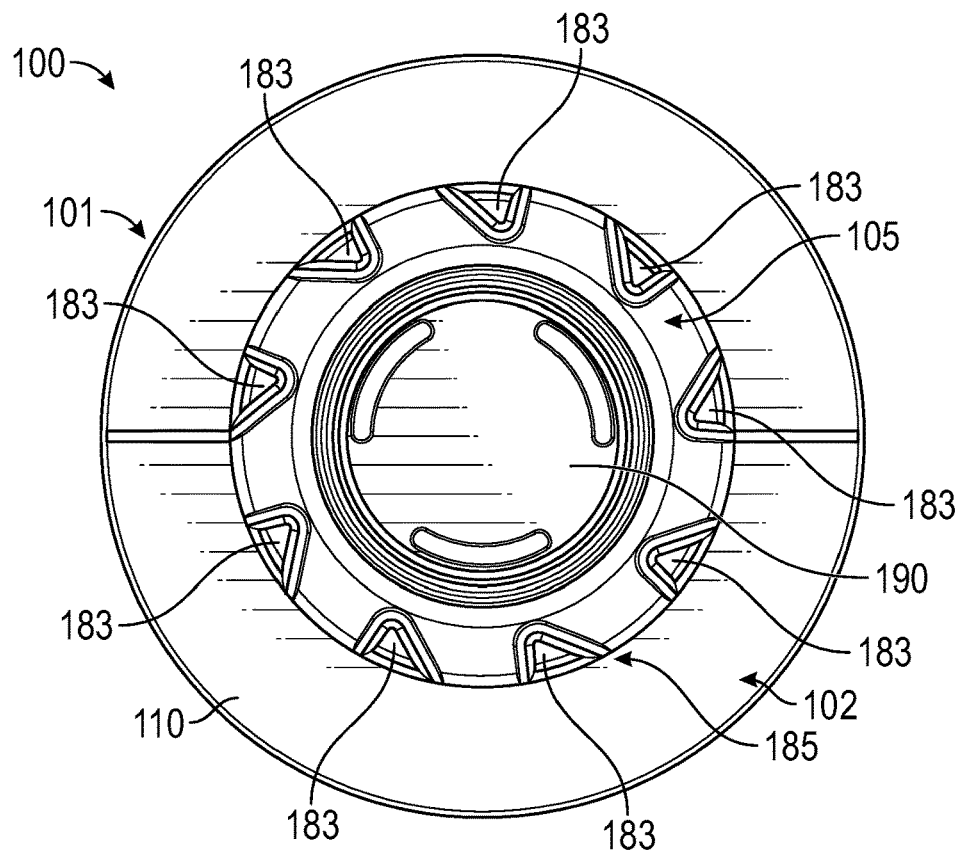
FIG. 7 is a top view of the rotary closure of FIG. 1.

As shown in FIGS. 2-6, the housing 102 of the rotary closure 100 defines a cylindrically-shaped hollow stem 111 terminating in a saddle-shaped flange 110 extending laterally outward from the stem 111, as well as a first window 120 and a second window 121 formed by the stem 111. In operation, when attached to a shoe (not shown), the flange 110 rests comfortably over a tongue (not shown) of the shoe and a tensioning element 146 (FIG. 16) may be inserted through the first window 120 and the second window 121 for tightening, a mechanism which will be discussed in further detail below. As further shown in FIGS. 3-6, the dial 105 having an overmolded grip portion 185 is engaged with the stem 111 of the housing 102 when assembled, and the cover element 190 of the turnkey 106 is engaged with the dial 105 as shown in FIGS. 3-7. FIG. 7 shows the assembled rotary closure 100 from an aerial perspective, the visible components including the flange 110 of the housing 102, the overmolded grip portion 185 of the dial 105 and the cover element 190 of the turnkey 106. As shown, the overmolded grip portion 185 of the dial 105 further includes a plurality of recesses 183 circumferentially defined along the overmolded grip portion 185 which are configured to permit easy gripping and handling by the user.

Figure 8:
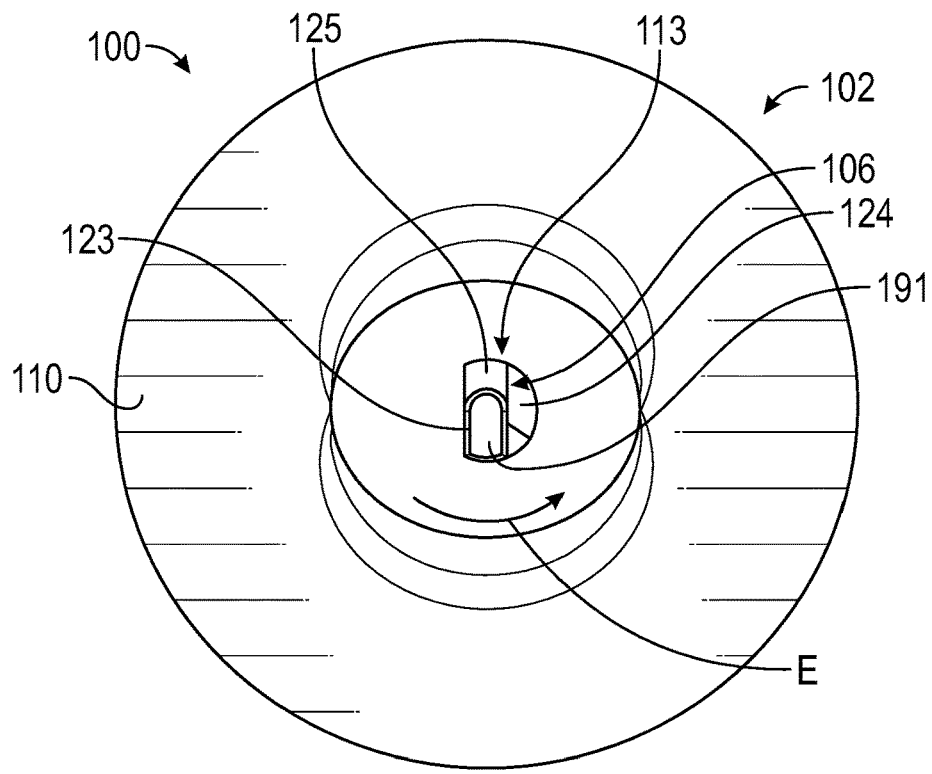
FIG. 8 is a bottom view of the rotary closure of FIG. 1.

FIG. 8 illustrates an underside perspective of the assembled rotary closure 100 including the flange 110 and housing keyway 113 of the housing 102 and the turnkey element 191 of the turnkey 106. In further detail, the housing keyway 113 defined axially through the housing 113 forms a lateral keyway portion 123 for insertion of the turnkey element 191 and a pocket 125. The pocket 125 is in operative communication with the lateral keyway portion 123 by way of a ramp 124, where a raised edge 124A of the ramp 124 terminates in the pocket 125 and a lowered edge 124B of the ramp 124 terminates in the lateral keyway portion 123 of the housing keyway 113.

During operation, the turnkey element 191 is inserted through the lateral keyway portion 123 and rotated in a clockwise or counterclockwise direction E, where the turnkey element 191 follows the path of the ramp 124 and snaps into the pocket 125 in a snap-fit engagement such that the turnkey element 191 is prevented from moving out of the pocket 125 without manual intervention. The turnkey element 191 is comprised of a flexible material which allows the turnkey element 191 to flex as the turnkey element 191 follows the path of the ramp 124 and also allows the turnkey element 191 to retain its original shape when seated into the pocket 125.

Figure 9:
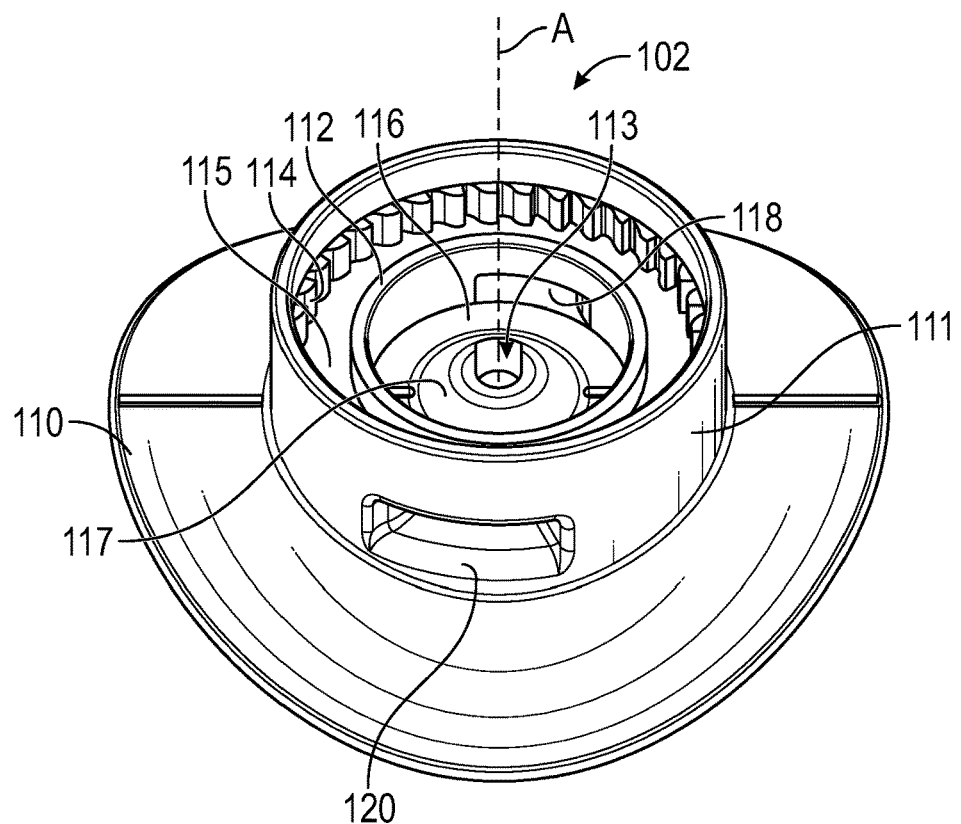
FIG. 9 is a top perspective view of a housing for the rotary closure of FIG. 1.
Figure 10:
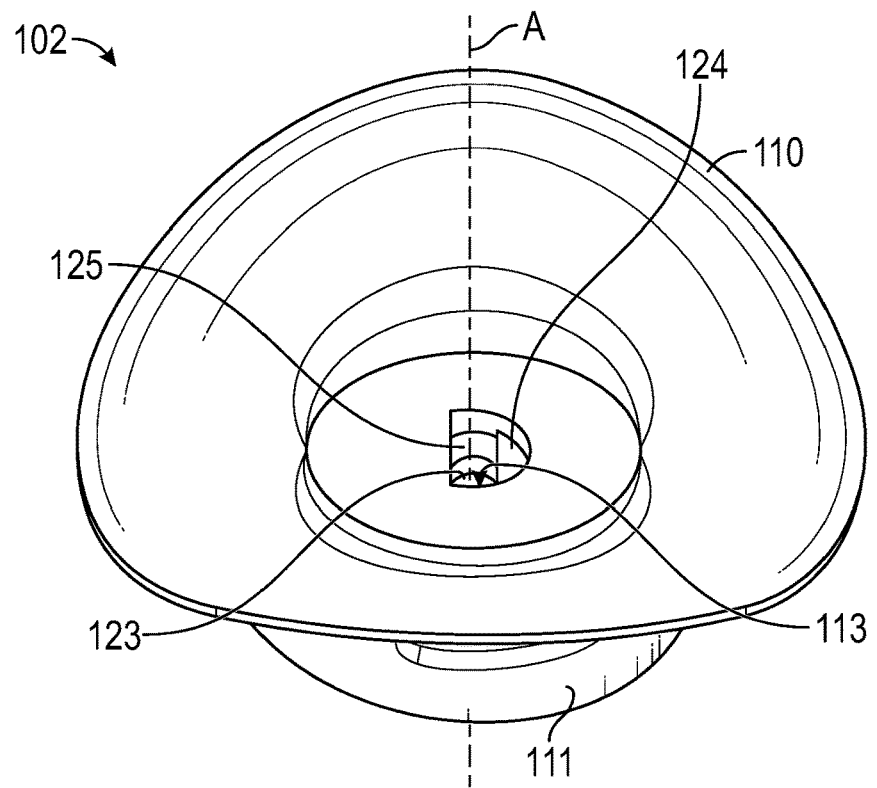
FIG. 10 is a bottom perspective view of the housing.
Figure 11:
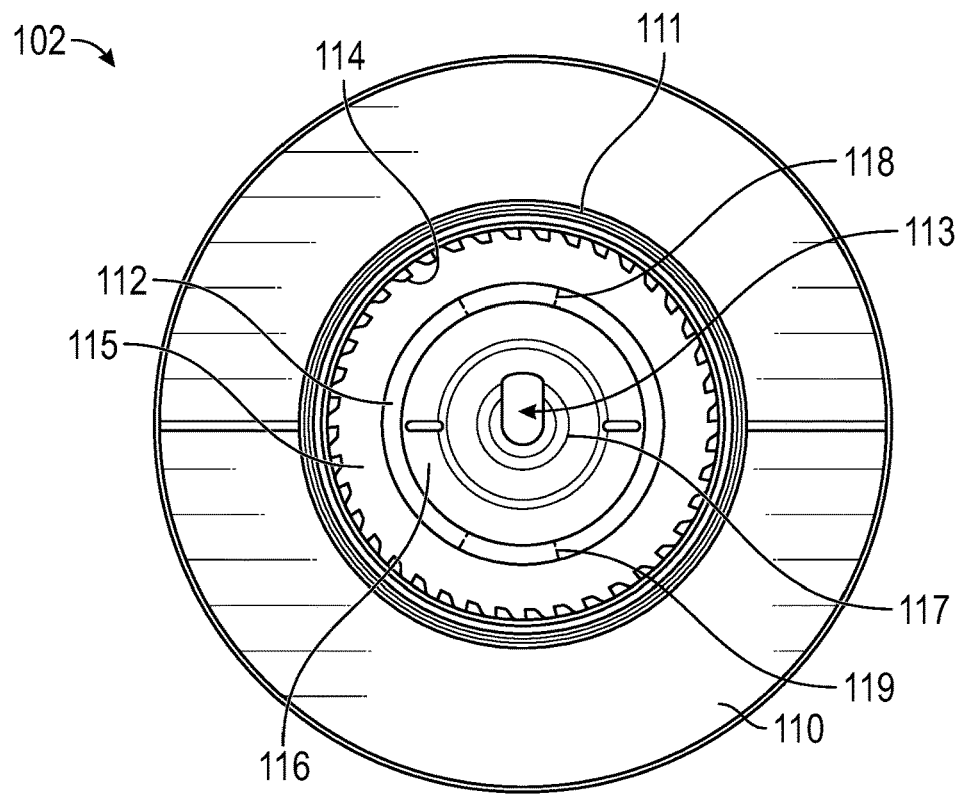
FIG. 11 is a top plan view of the housing.

In some embodiments shown in FIGS. 9-13, the housing 102 further includes an inner circular housing segment 112 defined around the housing keyway 113 oriented around the vertical axis A, the inner circular housing segment 112 further defining a first aperture 118 (FIG. 9) and a second aperture 119 (FIG. 13) in lateral alignment with the first and second windows 120 and 121 of the housing 102. A first circular pathway 115 is thereby defined between the cylindrical stem 111 and the inner circular housing segment 112. FIGS. 9 and 11 further define a plurality of teeth 114 disposed along an interior surface 111A of the stem 111 extending into the first circular pathway 115 which are configured to operatively engage the snap spring assembly 104 as the dial 105 is incrementally rotated in the clockwise or counterclockwise rotational direction Q (FIG. 2) while preventing rotation of the dial 105 in the opposite clockwise or counterclockwise direction R (FIG. 2). A second circular pathway 116 is defined between the inner circular housing segment 112 and the housing keyway 113, where the second circular pathway 116 forms a raised keyway extension 117, as demonstrated in FIG. 9. The raised keyway extension 117 adds structural integrity to the housing keyway 113 and creates room underneath the housing 102 for the ramp 124 and pocket 125, shown in FIGS. 10, 12 and 13 for insertion of the turnkey 106. In addition, the raised keyway extension 117 in some embodiments is sized appropriately to meet with a spool base 132 (shown in FIGS. 15, 18, and 19) of the spool 103.

Figure 12:
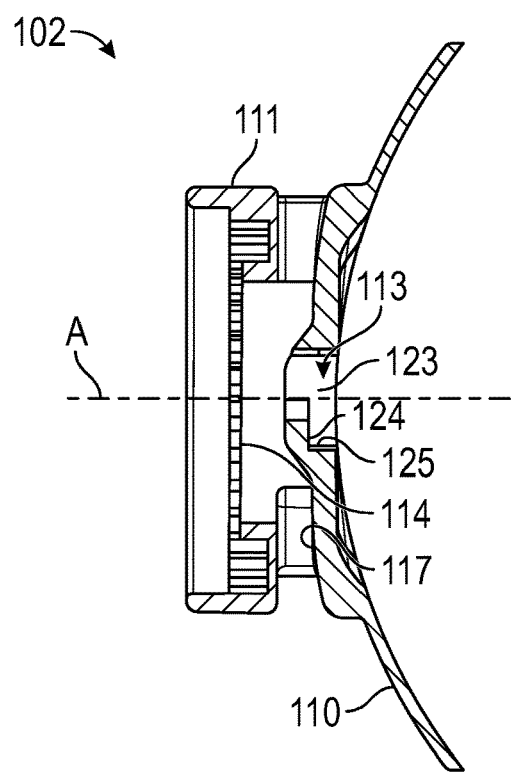
FIG. 12 is a cross sectional view of the housing.
Figure 13:
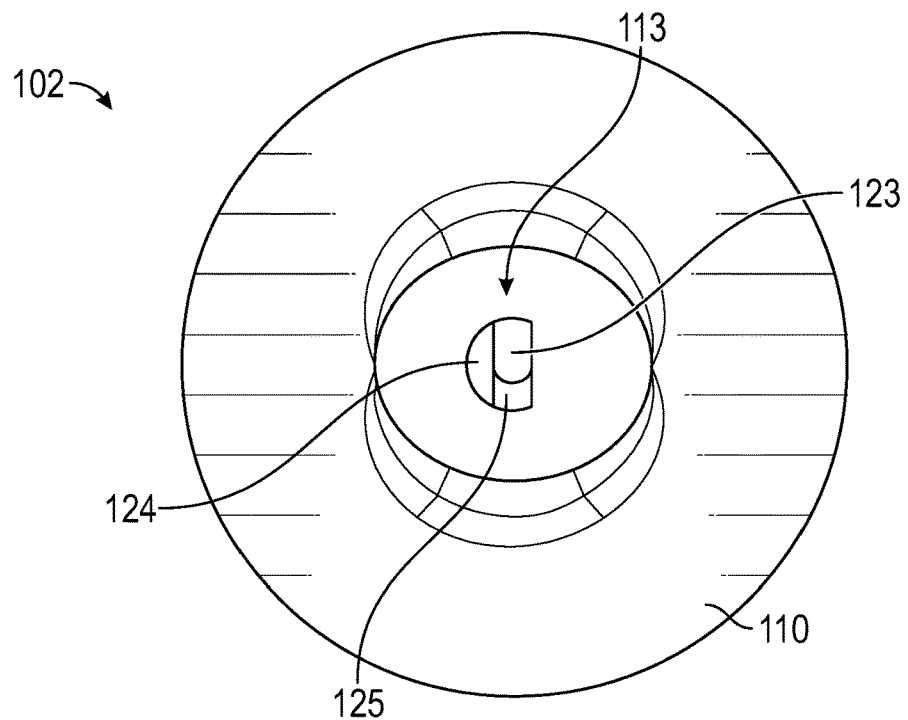
FIG. 13 is a plan view of a first keyway defined by the housing.

FIGS. 10 and 13 further show underside perspectives of the housing 102 of the rotary closure 100 illustrating the flange 110, the stem 111 (FIG. 10) and the housing keyway 113, where the housing keyway 113 defines the lateral keyway portion 123, the ramp 124 and the pocket 125 for insertion and engagement of the turnkey 106. FIG. 12 shows a cross-sectional side view of the housing 102 with the vertical axis A turned sideways. The housing 102 includes the stem 111 defining teeth 114 formed along the interior surface 111A, the flange 110 with the housing keyway 113 forming the lateral keyway portion 123, the ramp 124, and the pocket 125. As discussed above, during operation, the turnkey 106 defining the turnkey element 191 is inserted through the lateral keyway portion 123 of the housing keyway 113 and rotated in the clockwise or counterclockwise direction E (FIG. 8) such that the turnkey element 191 is guided up the ramp 124 and secured into the pocket 125 in a snap-fit engagement.

Figure 14:
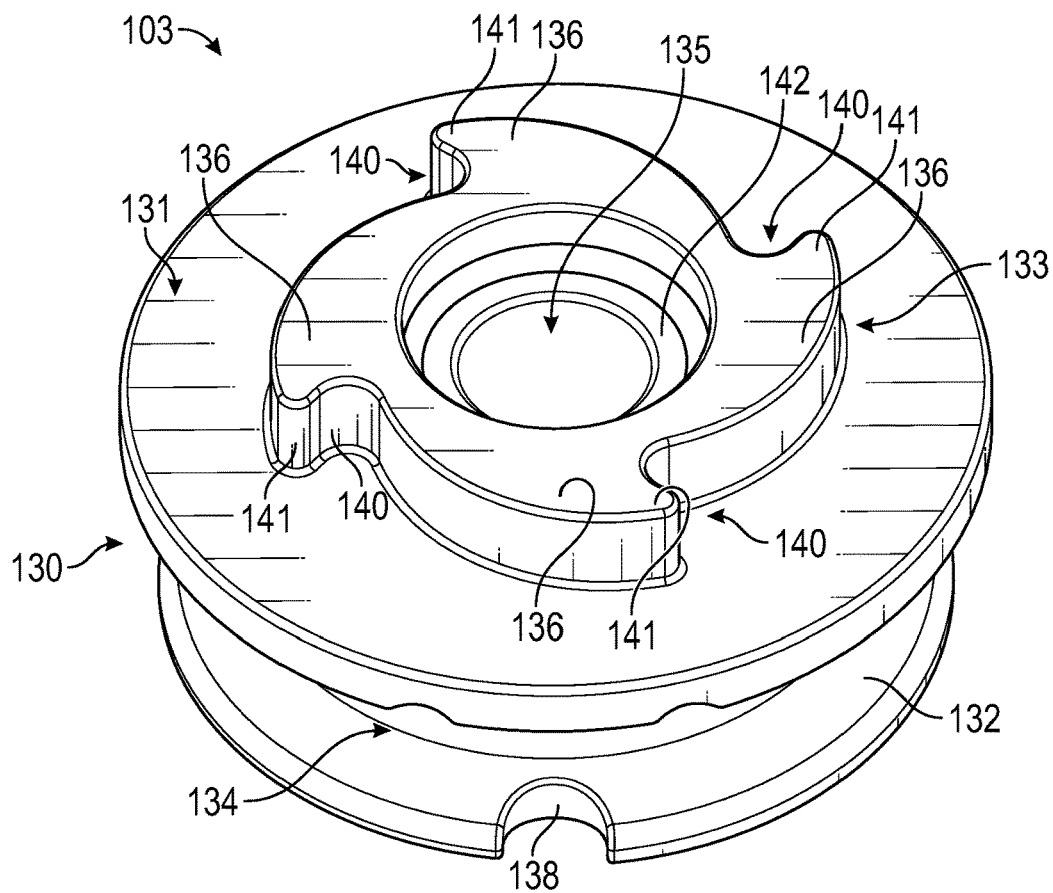
FIG. 14 is a top perspective view of a spool for the rotary closure of FIG. 1.
Figure 15:
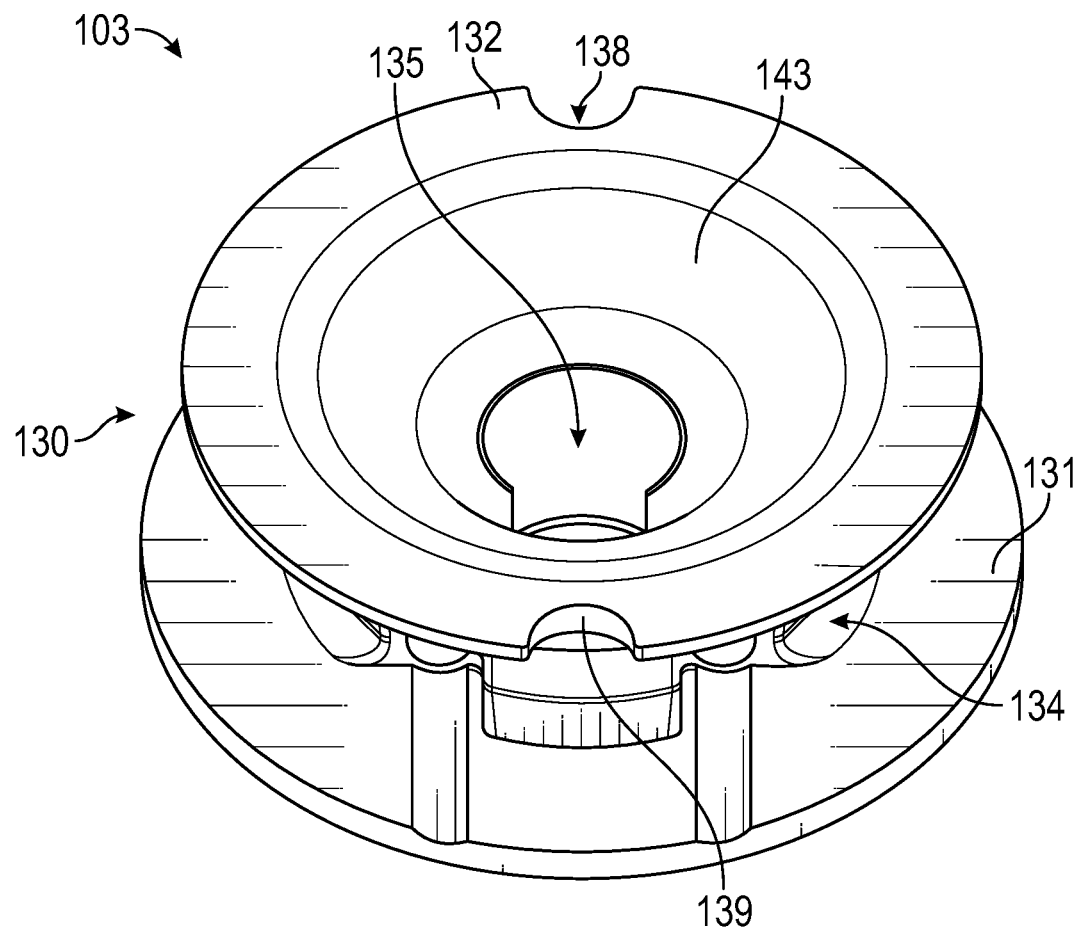
FIG. 15 is a bottom perspective view of the spool.
Figure 16:
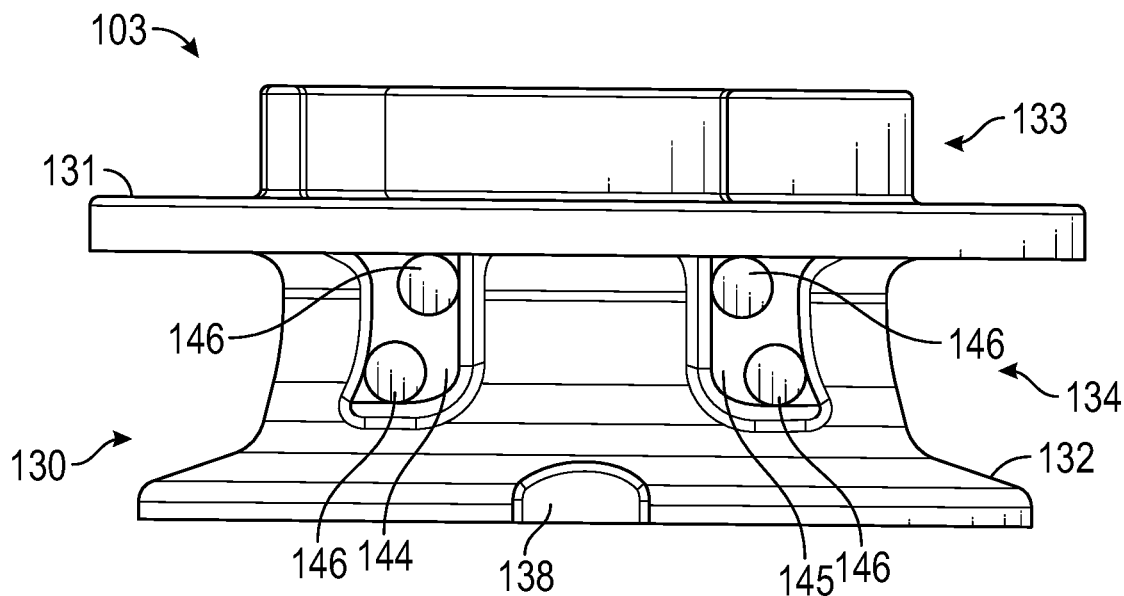
FIG. 16 is a side view of the spool.
Figure 17:
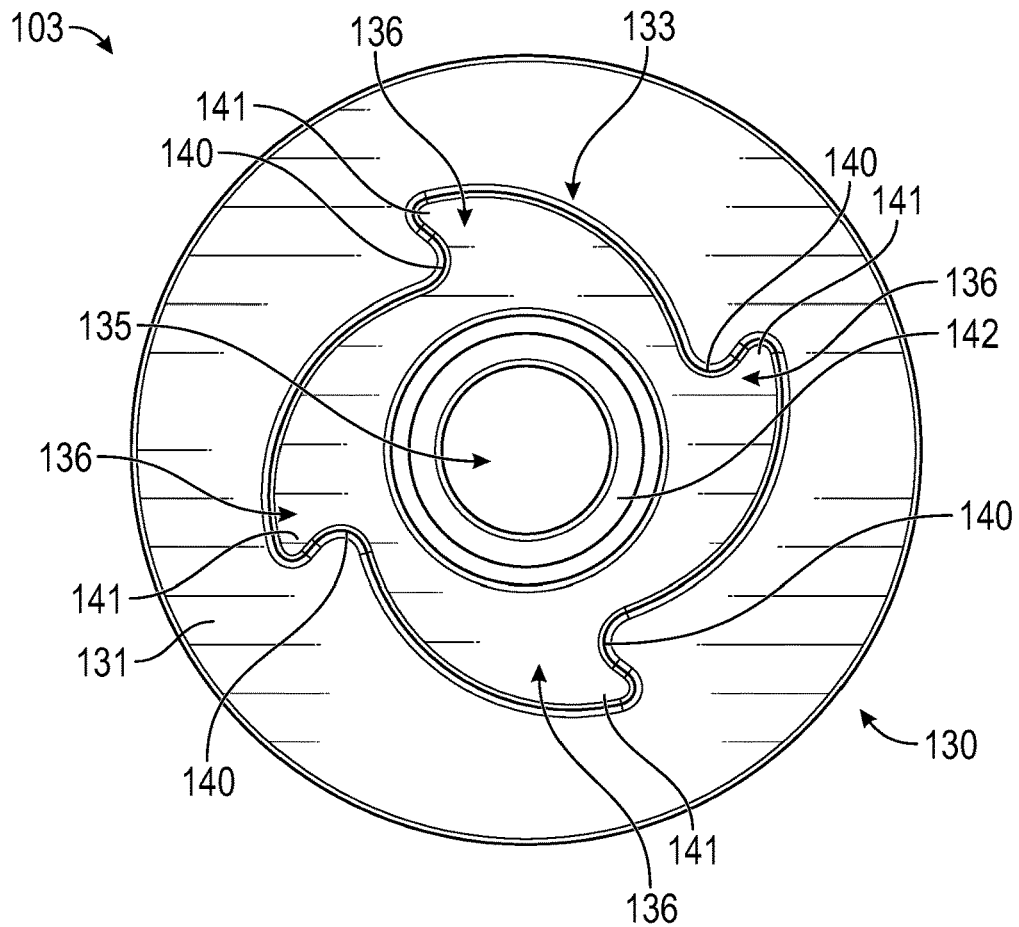
FIG. 17 is a top view of the spool.
Figure 18:
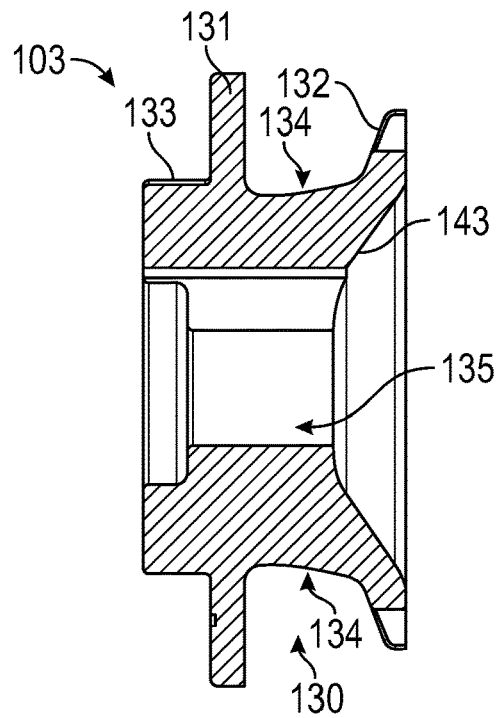
FIG. 18 is a cross-sectional view of the spool.
Figure 19:
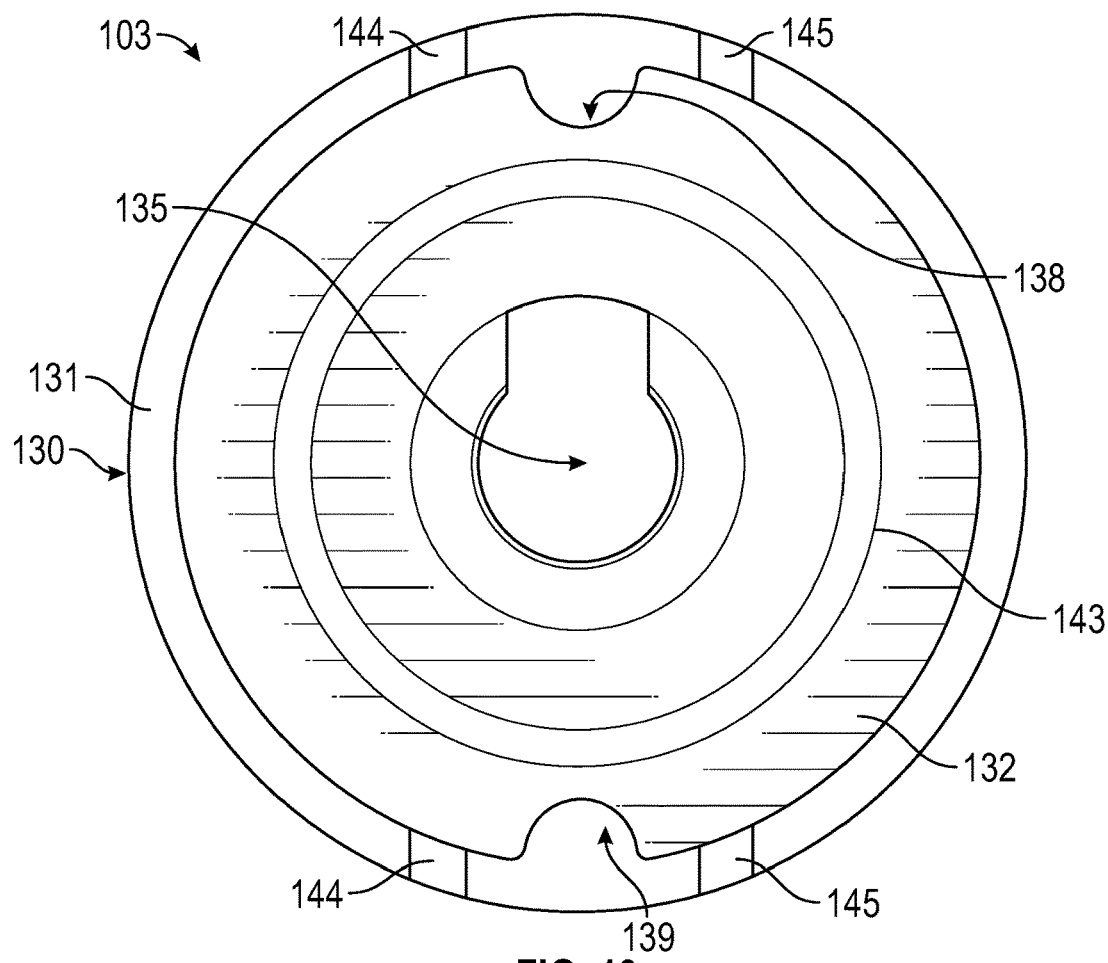
FIG. 19 is a bottom view of the spool showing a second keyway defined by the spool.
Figure 20:
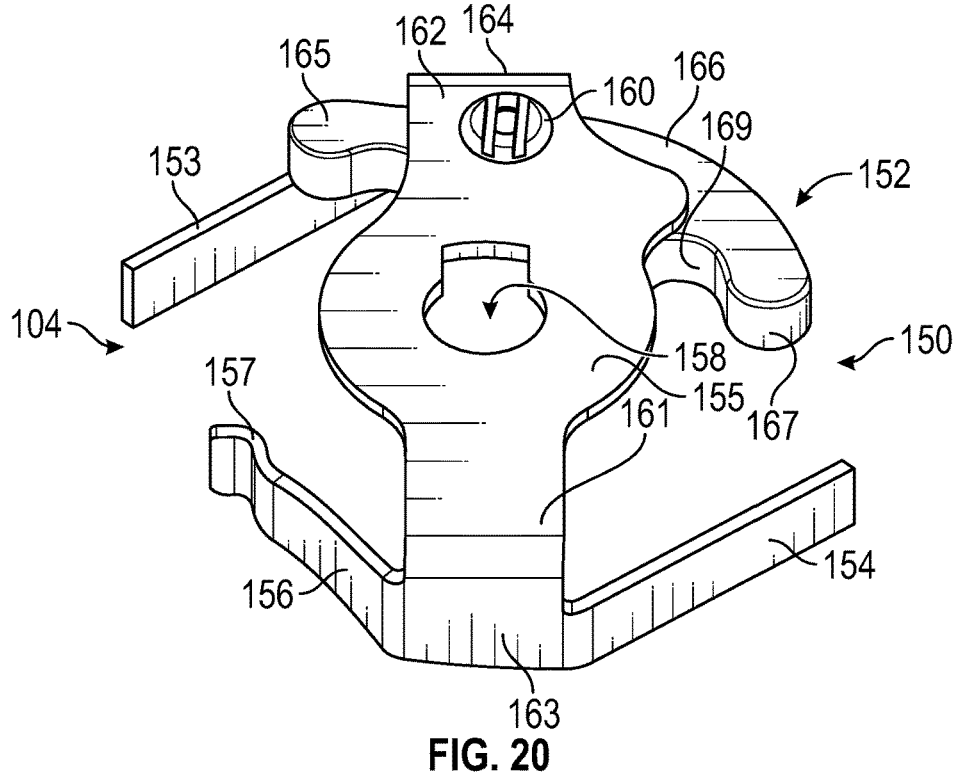
FIG. 20 is a top perspective view of a snap spring assembly for the rotary closure of FIG. 1.
Figure 21:
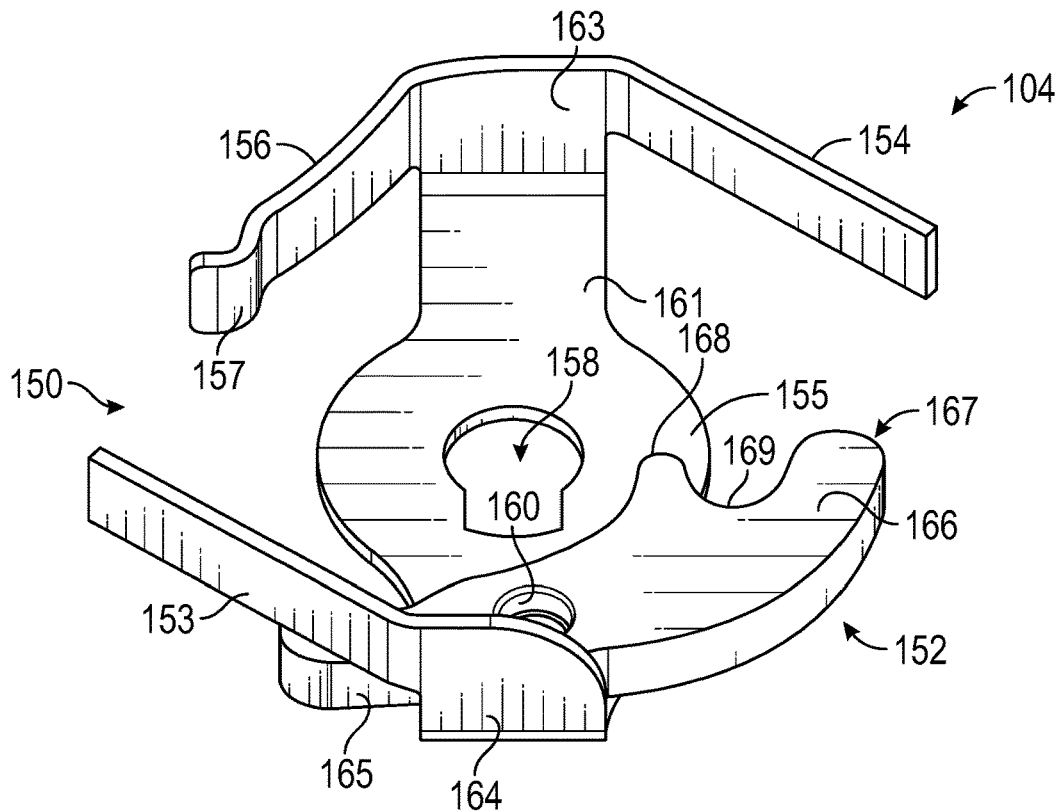
FIG. 21 is a bottom perspective view of the snap spring assembly.

An embodiment of the spool 103 of the rotary closure 100 is shown in FIGS. 14-19, where the spool 103 controls the operation of a tensioning element 146 (FIG. 16), used to lace a shoe (not shown) by operation of the rotary closure 100 and is seated within the inner circular housing segment 112 of the housing 102. The spool 103 includes a body 130 forming a spool base 132 and a spool flange 131 that collectively define a channel 134 between the spool base 132 and the spool flange 131. As shown in FIG. 14, a spool extension 133 extends from the spool flange 131 and defines a plurality of teeth 136 having alternating recesses 140 and ridges 141 for engagement of the snap spring assembly 104 (a mechanism which will be described in further detail below) such that the spool 103 is rotated in the clockwise or counterclockwise direction Q (FIG. 2) and is prevented from rotating in the opposite clockwise or counterclockwise direction R (FIG. 2). As shown in FIG. 14, the spool 103 further includes a spool shoulder 142 defined between an interior of the spool extension 133 and the spool keyway 135 formed axially through the body 130 of the spool 103 for insertion of the turnkey 106. The spool base 132 shown in FIG. 14 further defines a first arcuate slot 138 for allowing passage of the tensioning element 146 during assembly of the rotary closure 100. As shown in FIGS. 15, 18 and 19, the spool base 132 further defines a spool well 143 terminating in the spool keyway 135 and a second arcuate slot 139 situated opposite from the first arcuate slot 138 that also allows passage of the tensioning element 146 during assembly of the rotary closure 100. FIG. 16 illustrates a first spool window 144 and a second spool window 145 defined along the channel 134 such that tensioning elements 146 are disposed within and wound inside the channel 134 around the spool 103.

During operation of the latching system 101, as shown in FIG. 2, the spool base 132 of the spool 103 is disposed within the inner circular housing segment 112 of the housing 102 such that the spool extension 133 engages with the snap spring 104. The spool keyway 135 is aligned with the housing keyway 113 of the housing 102 such that the turnkey element 191 of the turnkey 106 may be inserted through both the housing keyway 113 and the spool keyway 135 simultaneously.

Referring to FIGS. 20-24, the snap spring assembly 104 of the rotary closure 100 includes a body 150 having a center portion 155 forming a first lateral arm 161 and a second lateral arm 162 situated opposite to the first lateral arm 161. The first lateral arm 161 defines a first shoulder 163 and a first spring 154 extending laterally from the first shoulder 163. The first shoulder further defines a second spring 156 having a curved terminal end 157 protruding laterally from an opposite side of the first shoulder 163, as shown in FIGS.

20-23. The second lateral arm 162 defines a second shoulder 164 and a third spring 153 situated opposite from the second spring 156, as shown in FIGS. 20-23. The snap spring assembly 104 further includes a pawl 152 in engagement with the second lateral arm 162 by a pivot element 160, where the second lateral arm 162 defines an aperture (not shown) to receive the pivot element 160. In some embodiments shown in FIGS. 20-23, the pawl 152 defines a proximal portion 165 and an opposite distal portion 166 such that the distal portion 166 forms a first ridge 167 and a second ridge 168 with a recess 169 defined between ridges 167 and 168. As shown in FIG. 2, the pawl 152 is configured for engagement with one of the plurality of teeth 136 of the spool extension 133 of the spool 103 and is operable to pivot about the pivot element 160 when the spool 103 is rotated.

Figure 22:
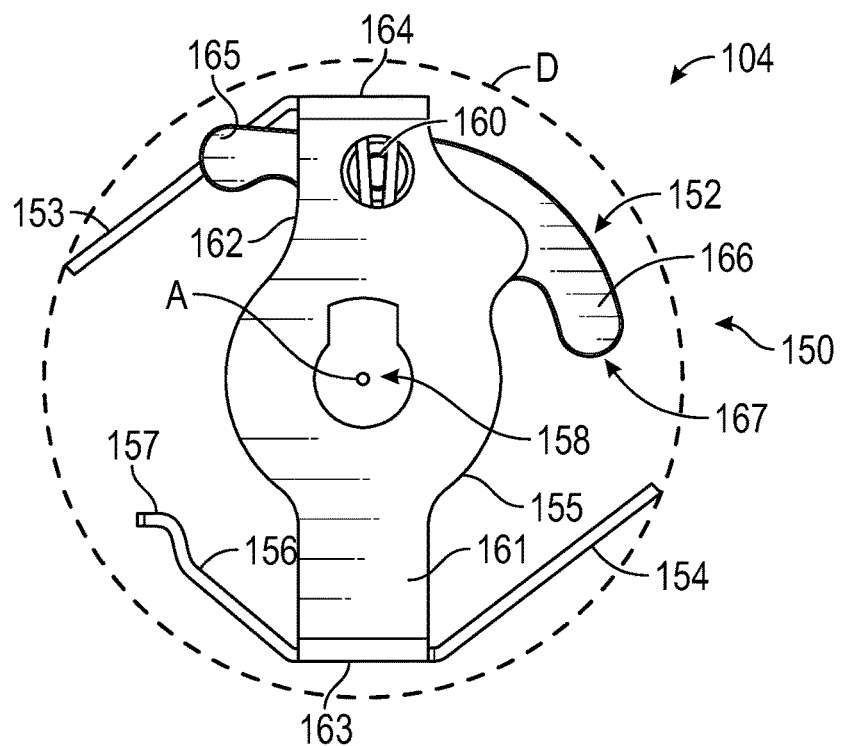
FIG. 22 is a top view of the snap spring assembly.
Figure 23:
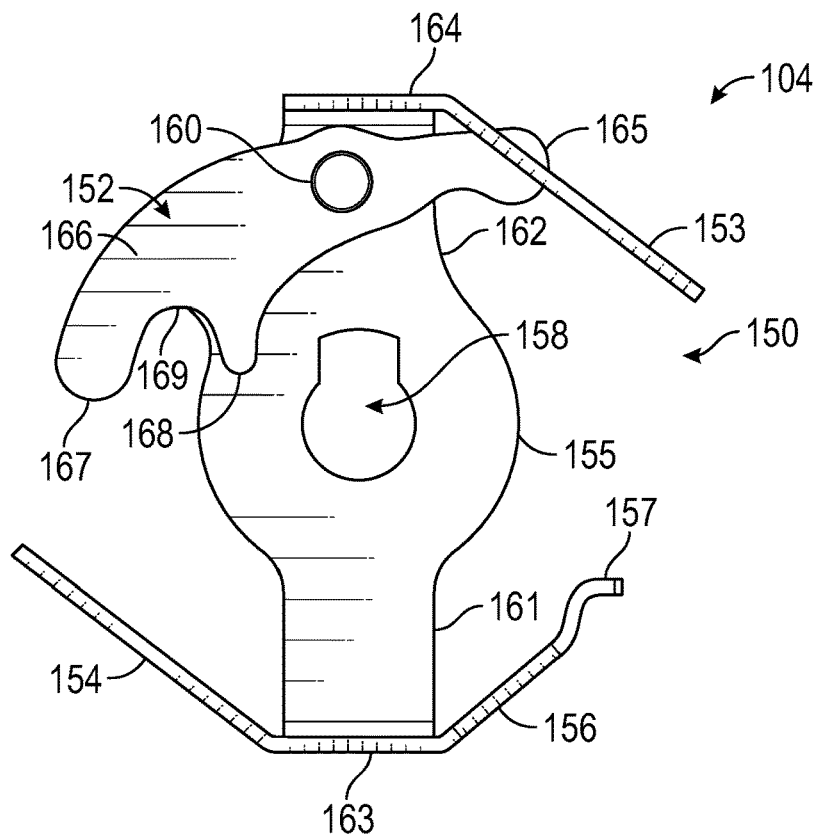
FIG. 23 is a bottom view of the snap spring assembly.
Figure 24:
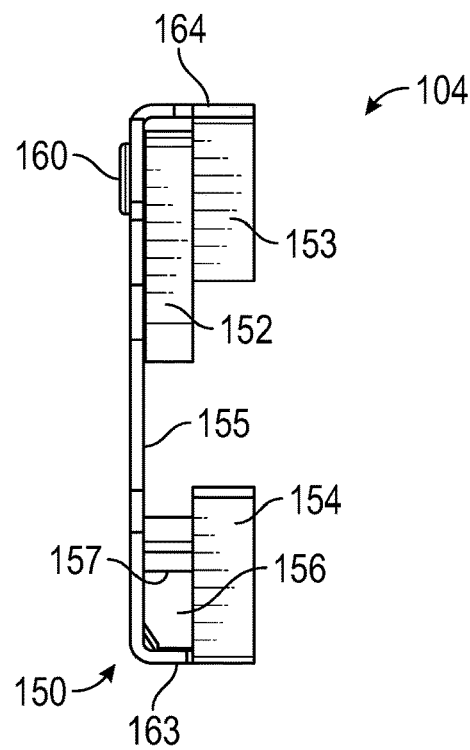
FIG. 24 is a side view of the snap spring assembly.
Figure 25:
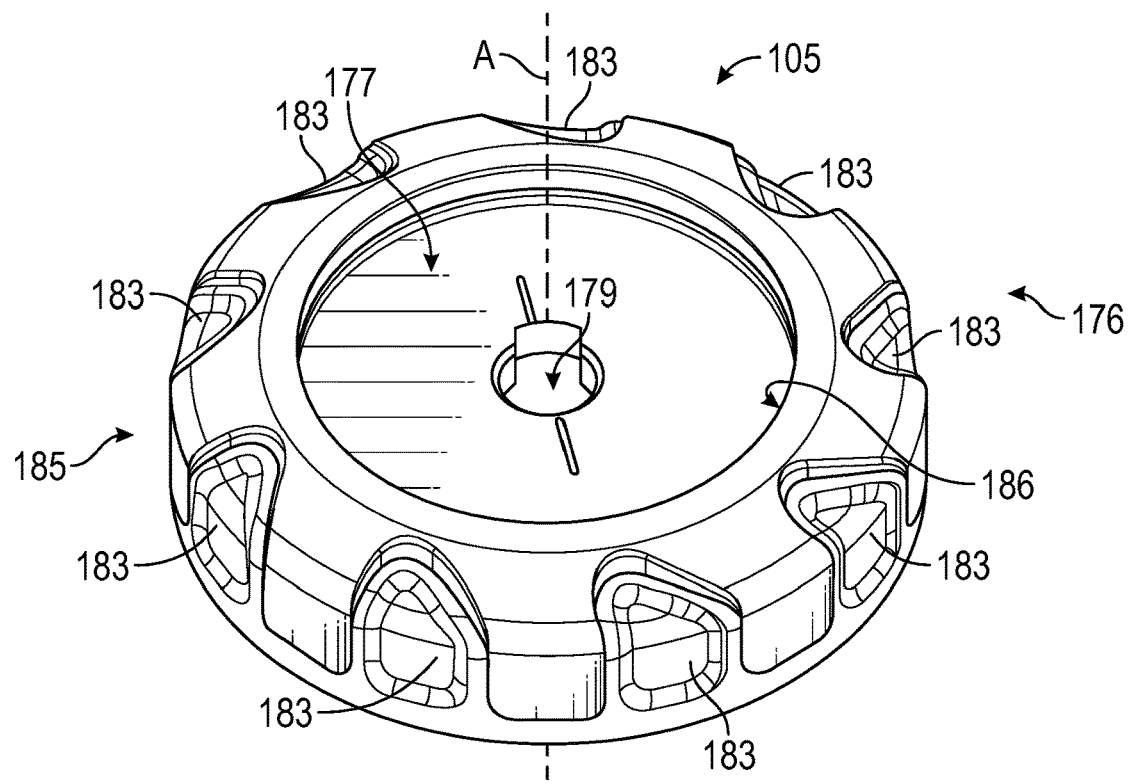
FIG. 25 is a top perspective view of a dial for the rotary closure of FIG. 1.
Figure 26:
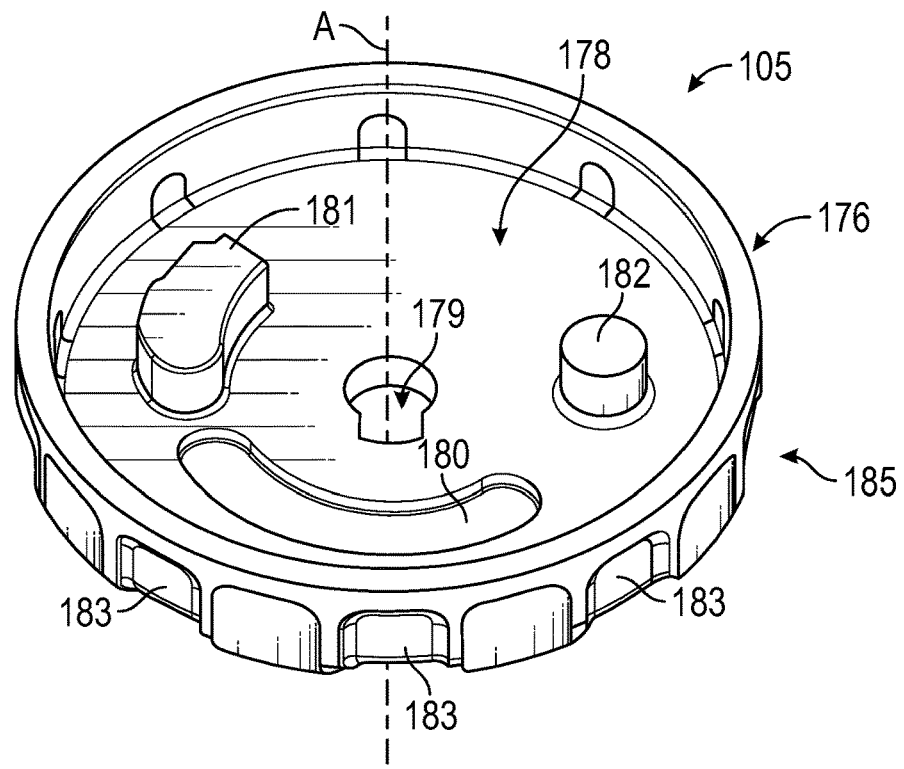
FIG. 26 is a bottom perspective view of the dial.
Figure 27:
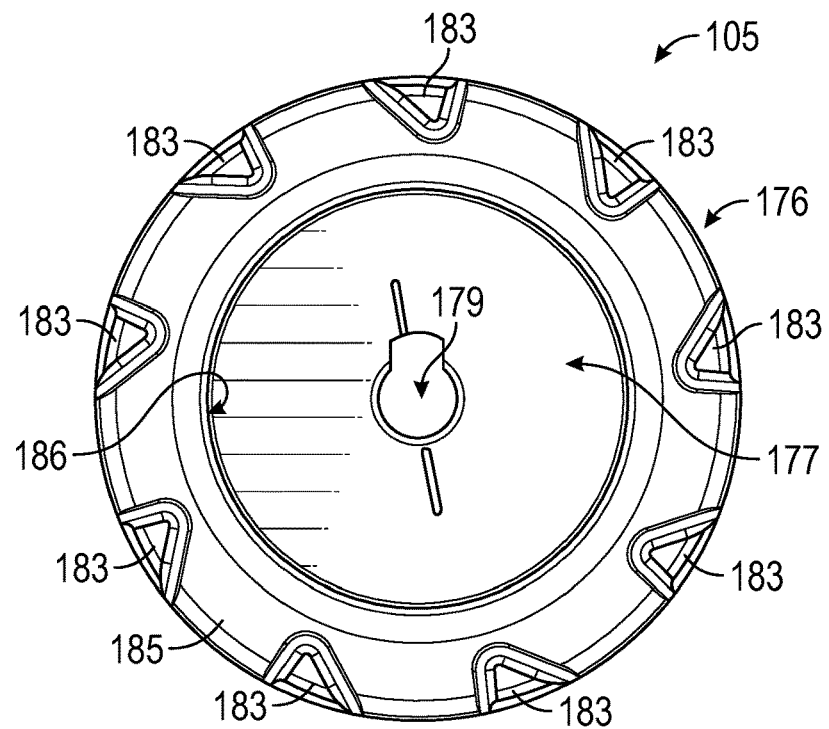
FIG. 27 is a top view of the dial.
Figure 28:
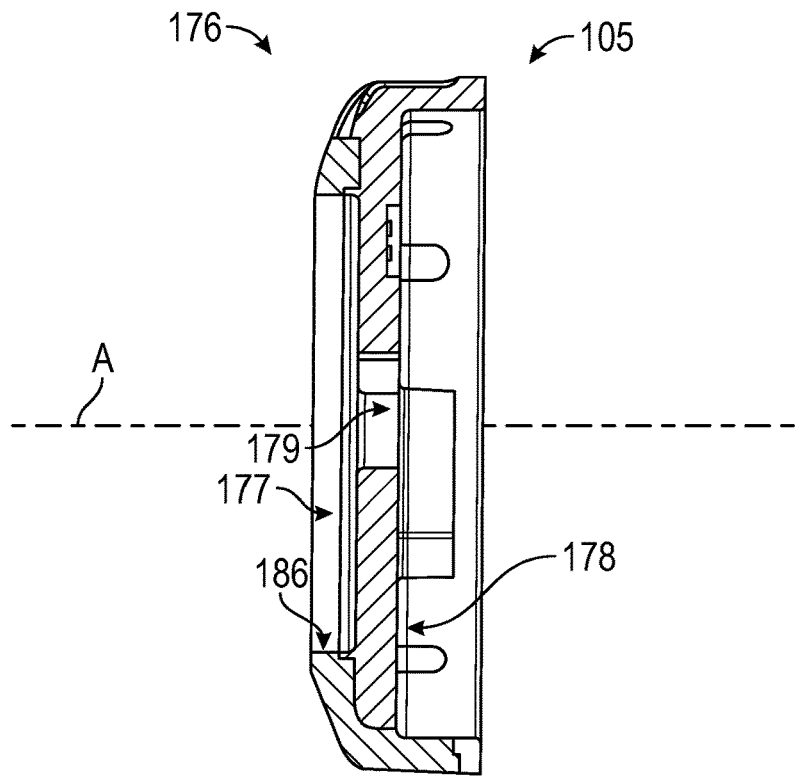
FIG. 28 is a cross-sectional view of the dial.
Figure 29:
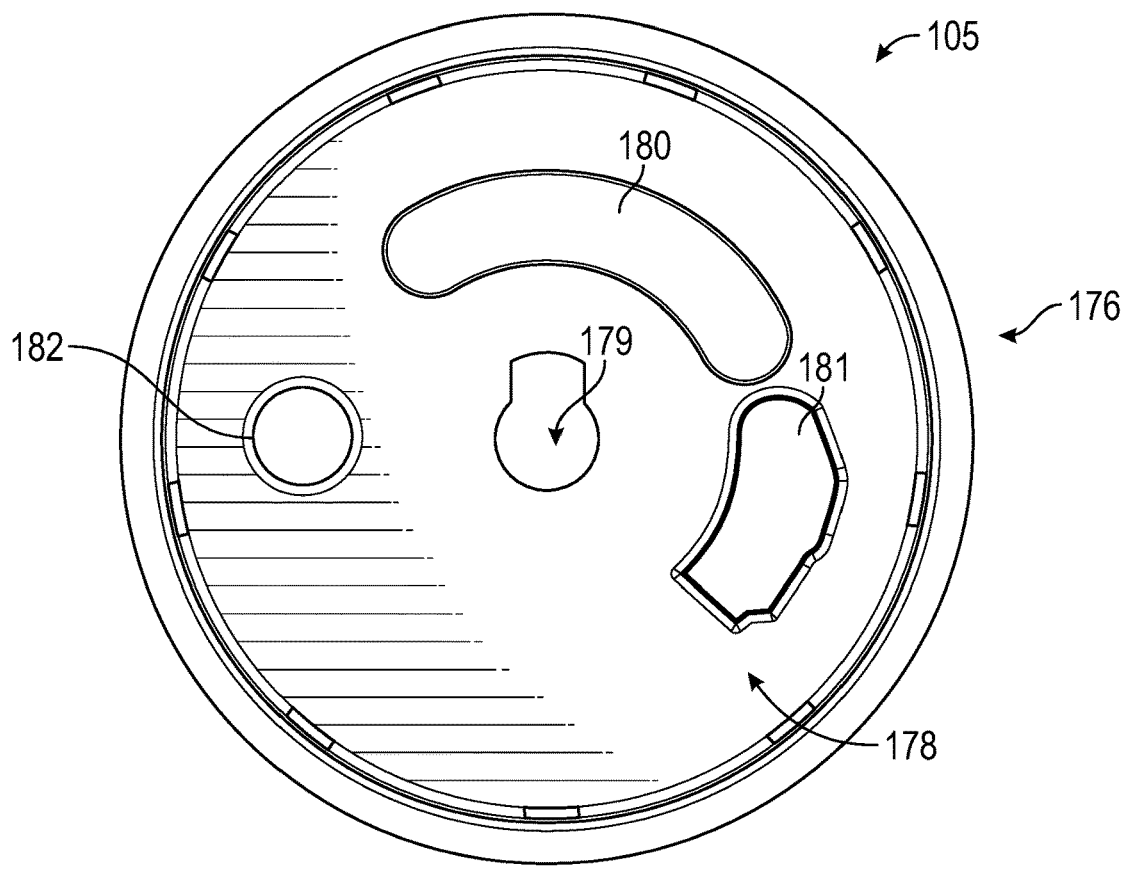
FIG. 29 is a bottom view of the dial.
Figure 30:
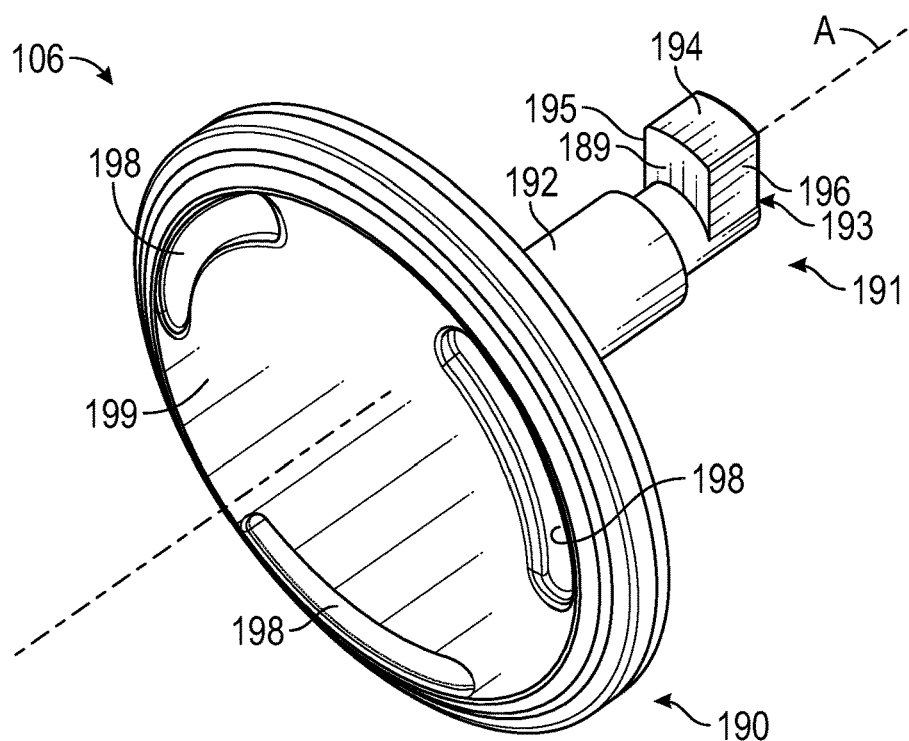
FIG. 30 is a top perspective view of a turnkey of the latching system of FIG. 1.

During operation, the recess 169 of the pawl 152 is configured to engage a respective ridge 141 of the spool extension 133 such that rotation of the spool 103 is controlled by the pawl 152, allowing rotation of the spool 103 in the clockwise or counterclockwise direction Q (FIG. 2) but preventing rotation in the opposite clockwise or counterclockwise direction R (FIG. 2). The first spring 153 and the second spring 154 of the snap spring assembly 104 are each configured to incrementally engage one of the plurality of teeth 114 of the housing 102 as the dial 105 is rotated by the user. In addition, the third spring 156 having a terminal end portion 157 also engages one of the plurality of teeth 114 such that counter-rotation of the snap spring assembly 104 is prevented when the dial 105 is rotated in the opposite clockwise or counterclockwise direction R by the user. The snap spring assembly 104 is further configured such that the first, second and third springs 154, 156 and 153 extend outwardly to circumference D as illustrated in FIG. 22. As shown, the snap spring keyway 158 is formed through the center portion 155 of the snap spring assembly 104 along axis A and is in coaxial alignment and communication with the housing keyway 113 and the spool keyway 135 for the insertion of a turnkey 106 for operation of the latching system 101.

As illustrated in FIGS. 25-29, the dial 105 provides a means for turning the rotary closure 100, the dial 105 having a dial body 176 defining an exterior surface 177 and an interior surface 178 with the dial keyway 179 formed axially through the dial 105. In some embodiments, the exterior surface 177 of the dial 105 includes an overmolded grip portion 185 having a plurality of respective grip recesses 183 formed equidistantly along the overmolded grip portion 185 for comfortable manual rotation of the dial 105 by the user. The exterior surface 177 further defines a circular recess 186 (FIGS. 25 and 27) such that the cover element 190 of the turnkey 106 rests within the circular recess 186 when assembled, as shown in FIG. 2. The interior surface 178 defines a raised post 182, where the post 182 is configured to engage with the proximal portion 165 of the pawl 152 when the dial 105 is turned in the clockwise or counterclockwise direction Q about the axis A (FIG. 2), causing the pawl 152 to pivot about the pivot element 160, thereby causing the pawl 152 to engage with one of the plurality of teeth 136 of the spool 103 and causing the spool 103 to rotate. The interior surface 178 further defines a raised extension 181 and a curved recess 180 in which the curved recess 100 defines a clearance area that permits the pivot element 160 of the snap spring assembly 104 to freely move during operation of the rotary closure 100. As shown in FIG. 2, during operation of the latching system 101 of the rotary closure 100 the dial keyway 179 is in axial alignment with the snap spring keyway 158, the spool keyway 135 and the housing keyway 113 for insertion of the turnkey 106.

Referring to FIGS. 29-34, the turnkey 106 provides a means for latching various components of the rotary closure 100 together in an assembled state. The turnkey 106 includes the turnkey element 191 having a free end 191A. In some embodiments, the turnkey 106 includes the cover element 190 with the turnkey element 191 extending axially from the cover element 190 along axis A. In some embodiments, the turnkey element 191 defines an axial portion 192 terminating at a tab 193; the tab 193 being formed at the free end 191A of the turnkey element extends in one perpendicular direction to the axial portion 192 and collectively forms a curved surface 194, a pair of opposite first and second sides 195 and 196, and a pair of opposite upper and lower surfaces 189 and 197. As shown, the cover element 190 forms a top surface 199 having a plurality of grip recesses 198 configured to receive a tool (not shown) for rotating the cover element 190 such that the turnkey element 191 is concurrently rotated.

In one method of latching the rotary closure 100 together into an assembled state, a user inserts the turnkey element 191 of the turnkey 106 through the housing keyway 113, spool keyway 135, snap spring keyway 158 and the dial keyway 179 formed by the co-axial alignment of the housing 102, the spool 103, the snap spring assembly 104, and the dial 105. Once the turnkey element 191 is fully inserted through the housing keyway 113, spool keyway 135, snap spring keyway 158 and the dial keyway 179, a tool (not shown) may be engaged with the grip recesses 198 of the cover element 190 and rotated 180 degrees such that the tab 193 also rotates 180 degrees and the upper surface 189 of the tab 193 rides over the ramp portion 124 of the housing keyway 113 of the housing 102 until the upper surface 189 of the tab 193 rides over the raised edge 124A of the ramp 124 and becomes seated within the pocket 125 of the housing keyway 113 and the turnkey 106 assumes a latched position. To unlock the turnkey 106, the cover element 190 is rotated in the opposite rotational direction until the tab 193 becomes disengaged from the pocket 124 and rides back over the ramp portion 124 of the lateral keyway portion 123 and becomes aligned with the housing keyway 113, spool keyway 135, snap spring keyway 158 and the dial keyway 179 such that the turnkey 106 assumes an unlatched position and may be withdrawn from the housing keyway 113, spool keyway 135, snap spring keyway 158 and the dial keyway 179.

Figure 35:
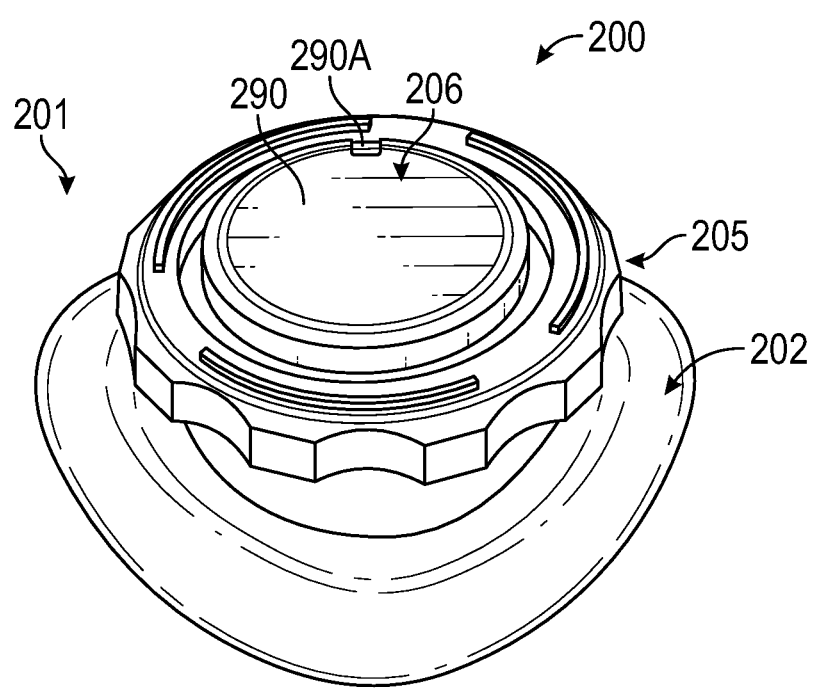
FIG. 35 is a perspective view of a second embodiment of the rotary closure.
Figure 36:
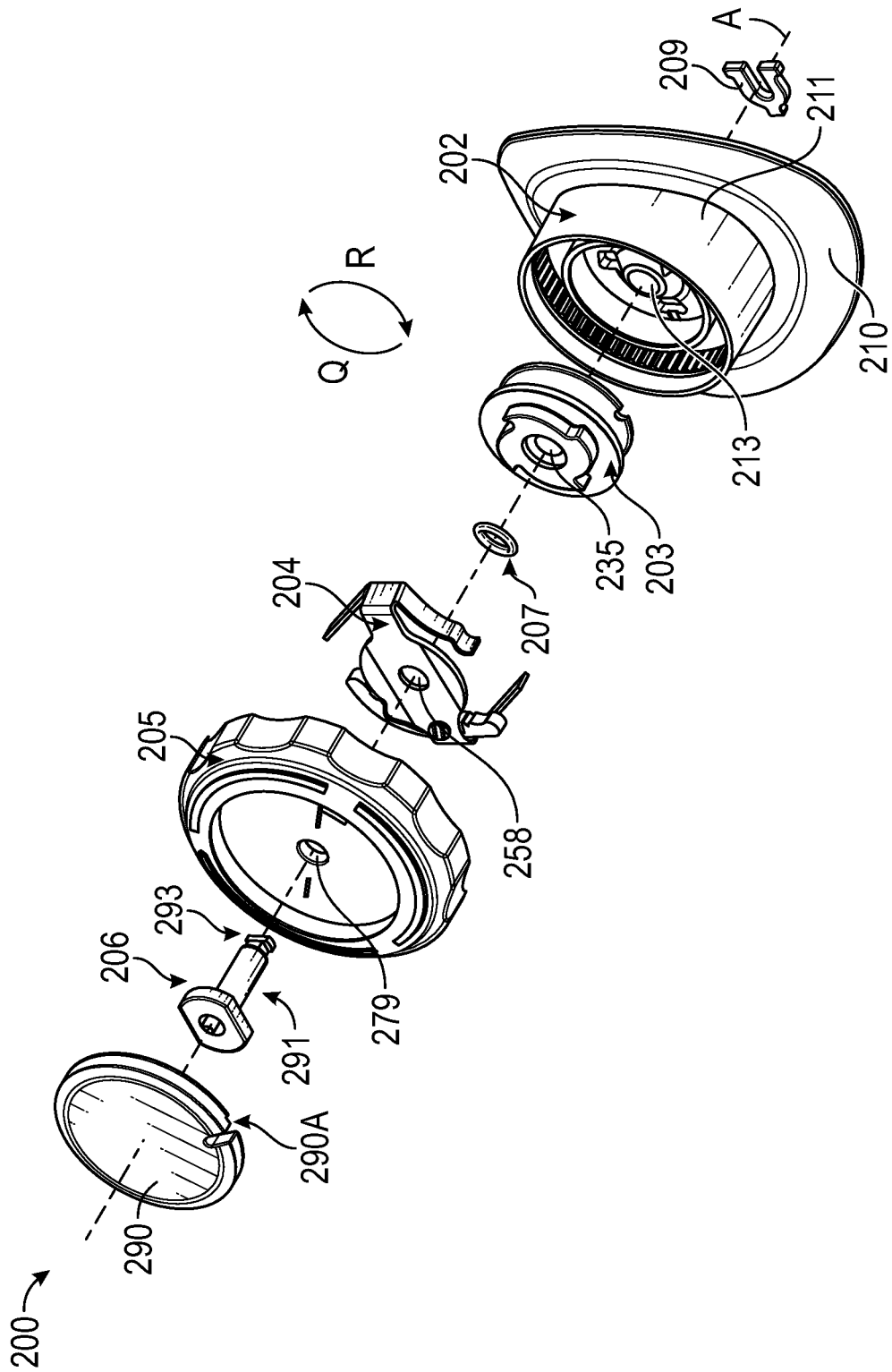
FIG. 36 is an exploded view of the rotary closure of FIG. 35.
Figure 37:
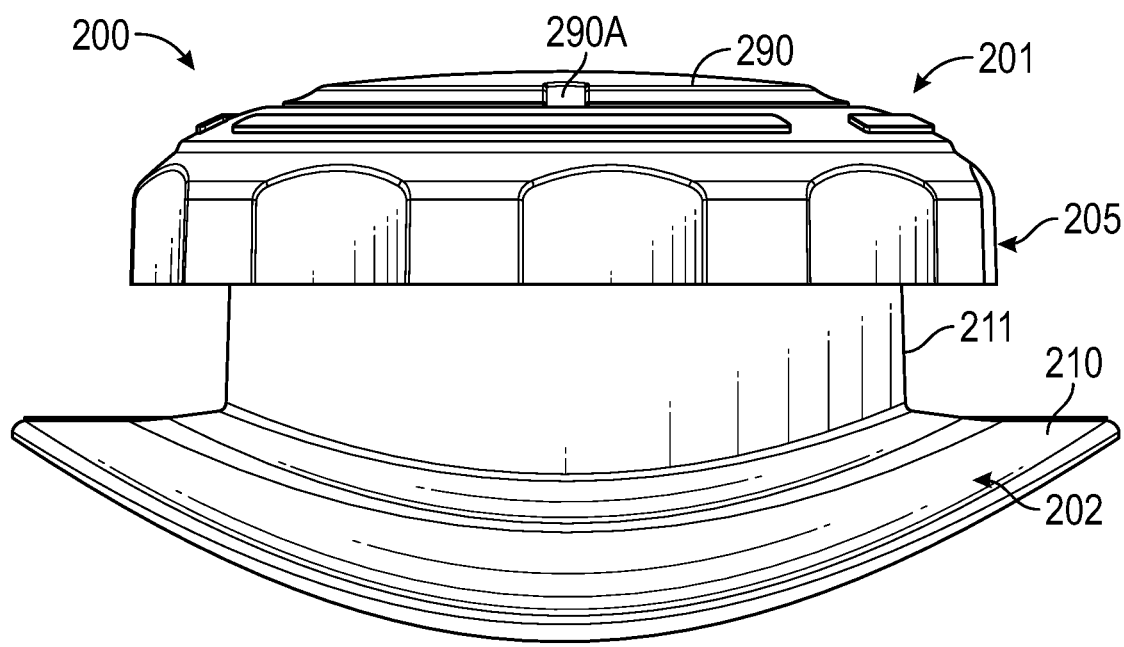
FIG. 37 is a front view of the rotary closure of FIG. 35.
Figure 38:
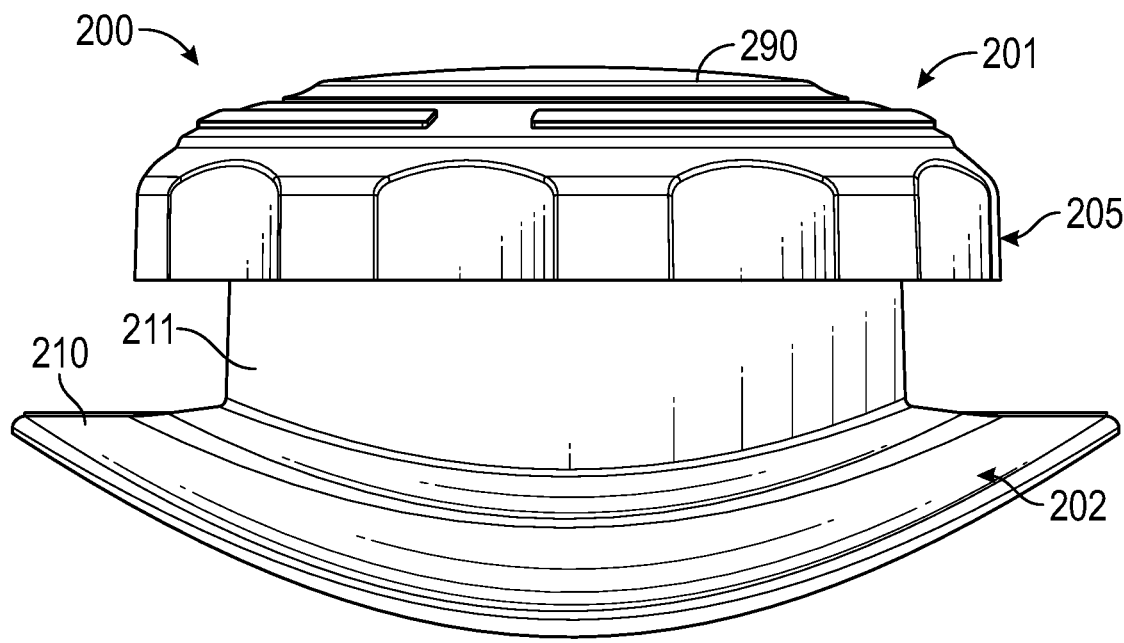
FIG. 38 is a rear view of the rotary closure of FIG. 35.
Figure 39:
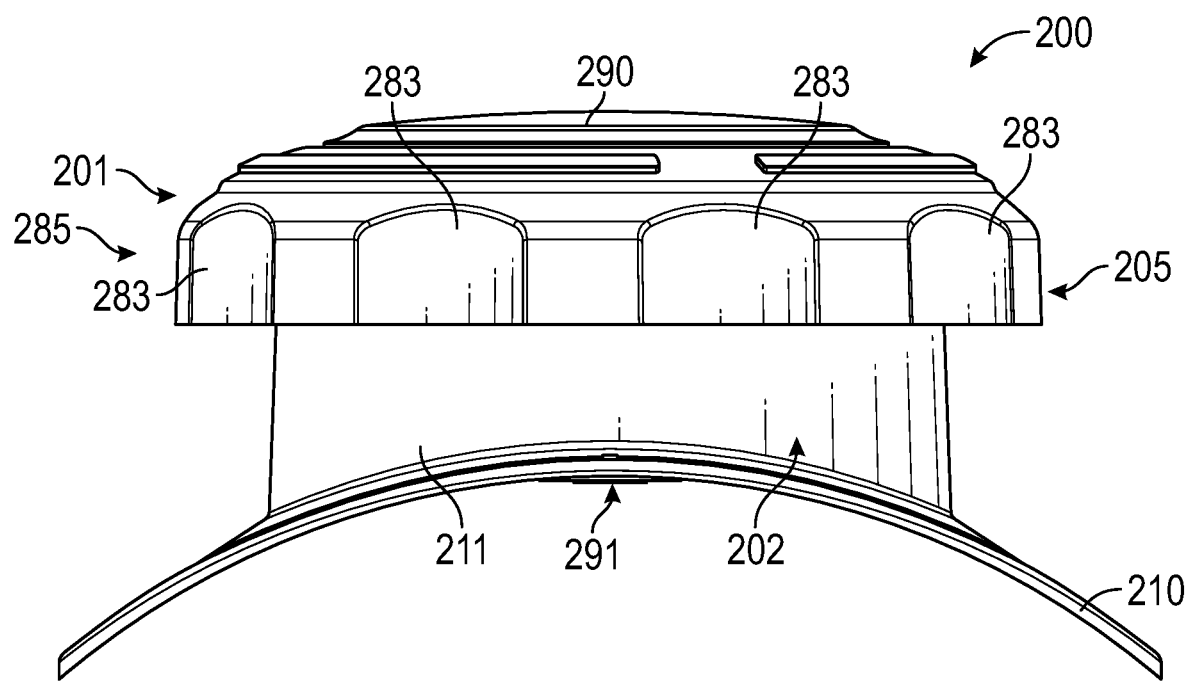
FIG. 39 is a side view of the rotary closure of FIG. 35.
Figure 40:
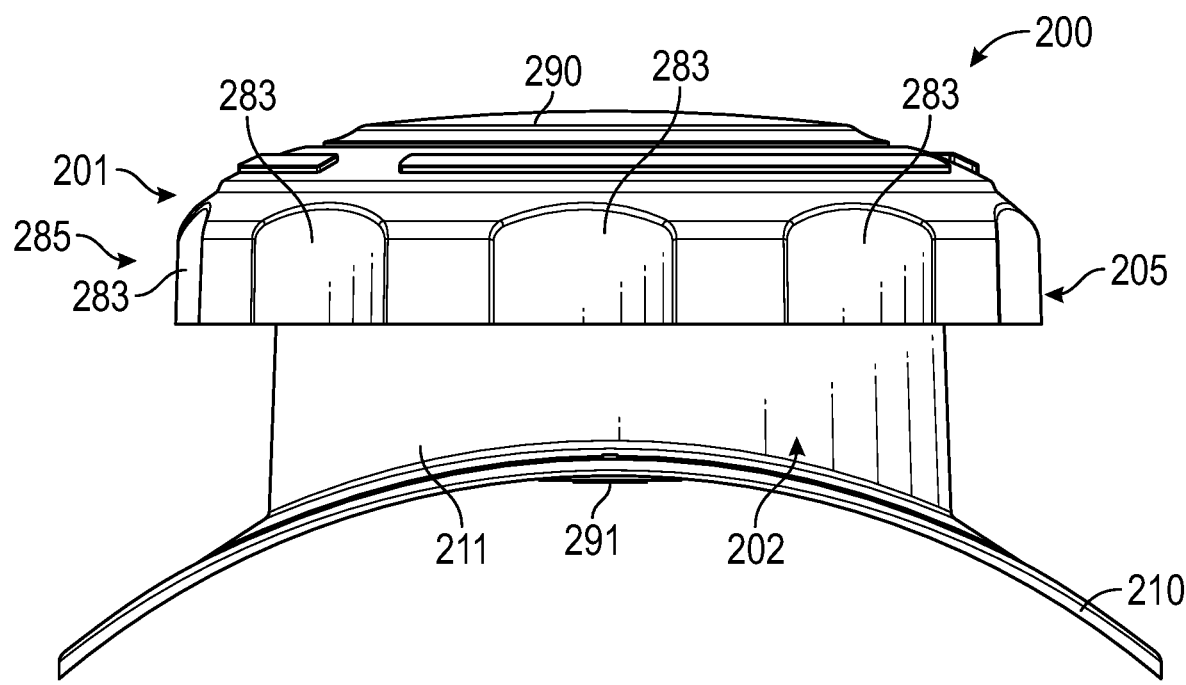
FIG. 40 is an opposite side view of the rotary closure of FIG. 35.

FIGS. 35-42 illustrate a second embodiment of the rotary closure 200 shown in an assembled state with a latching system 201 maintaining the components of the rotary closure 200 in a latched position such that the components of the rotary closure 200 are secured together in an assembled state. FIG. 35 in particular illustrates a perspective view of the rotary closure 200 having a distal-most component 202 and a dial 205, wherein other components of the rotary closure 200 are disposed within an enclosure formed by the housing 202 and the dial 205. In most embodiments, the distal-most component 202 is a housing 202 located farthest away from the dial 205. FIGS. 35 and 36 further illustrate a turnkey 206 used to latch together the components of the rotary closure 200. The turnkey 206 further includes a cover element 290 and a turnkey element 291 that extends axially from the cover element 290.

Referring to FIG. 36, the rotary closure 200 includes a spool 203 disposed within the housing 202 and a snap spring assembly 204 in operative engagement with the spool 203. As further shown in FIG. 36, the rotary closure 200 includes a plurality of assembled components that collectively form a plurality of aligned keyways 213, 235, 258, and 279. In particular, the housing 202 further defines a distal-most keyway 213 (referred to herein as a housing keyway 213), the spool 203 defines a spool keyway 235, the snap spring assembly defines a snap spring keyway 258, and the dial 205 defines a dial keyway 279. During operation, the dial 205, the snap spring assembly 204, the spool 203 and the housing 202 are oriented such that the dial keyway 279, the snap spring keyway 258, the spool keyway 235 and the housing keyway 213 are aligned along a vertical axis A. Once the dial keyway 279, the snap spring keyway 258, the spool keyway 203 and the housing keyway 213 are aligned, the turnkey 206 is inserted through the dial keyway 279, the snap spring keyway 258, the spool keyway 235 and the housing keyway 213 in order to secure the housing 202, the spool 203, the snap spring assembly 204, and the dial 205 together in the assembled state shown in FIG. 35. In some embodiments, a sealing element 207 is included to aid with the engagement of the spool 203 with the snap spring assembly 204. In addition, a clip 109 may be disposed underneath the housing 102 to aid with the engagement of the turnkey 106 with the housing keyway 113. Furthermore, the dial 205 is operatively engaged with the snap spring assembly 204 to allow for incremental rotation of the dial 205 in a clockwise or counterclockwise direction Q only, while preventing rotation of the dial 205 in an opposite clockwise or counterclockwise direction R. In this manner, the spool 203 is engaged with the snap spring assembly 204 and the dial 204 and the spool 203 and the snap spring assembly 204 are disposed within the enclosure formed by the dial 204 and the housing 202.

Figure 41:
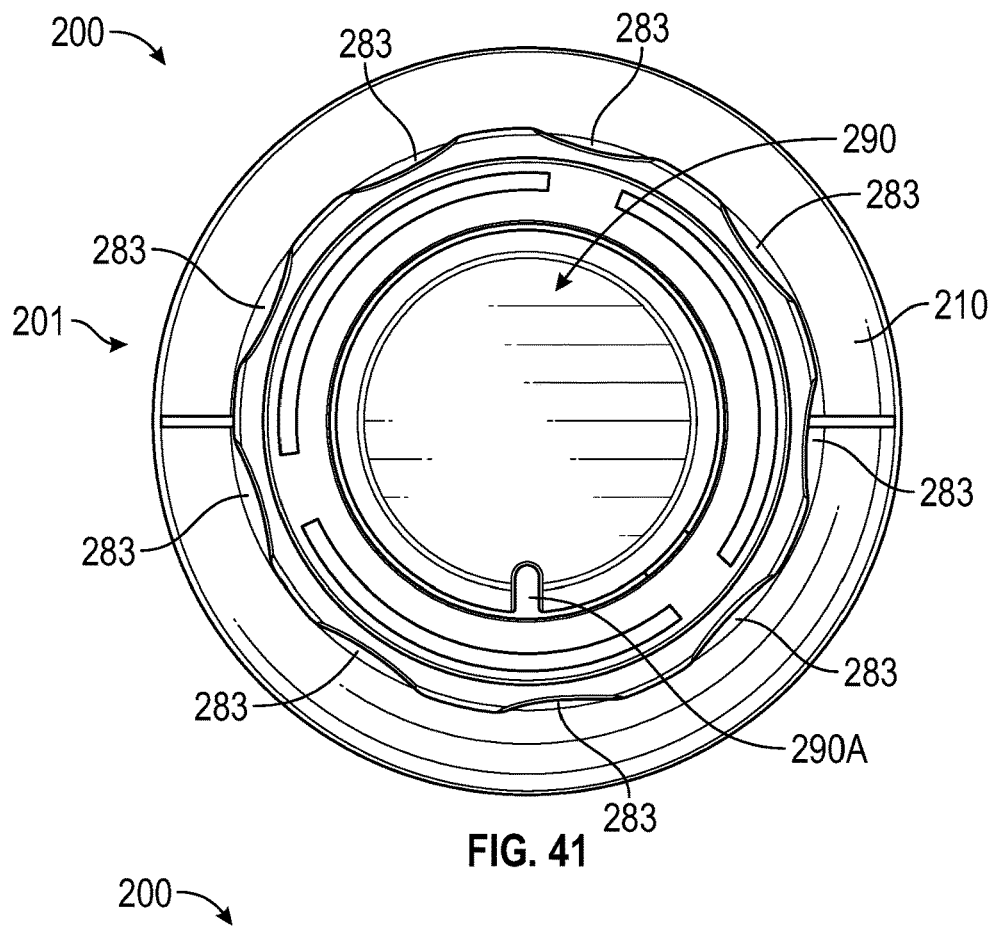
FIG. 41 is a top view of the rotary closure of FIG. 35.

FIGS. 36-46 illustrate the housing 202 of the rotary closure 200 having a cylindrically-shaped hollow stem 211 terminating in a saddle-shaped flange 210 extending laterally outward from the stem 211 and the housing keyway 213 defined axially through the housing 213. In operation, when attached to a shoe (not shown), the flange 210 may rest comfortably over a tongue (not shown) of the shoe. As further shown in FIGS. 36-41, the dial 205 having an overmolded grip portion 285 (FIG. 39) is engaged with the stem 211 of the housing 202 when assembled, and the cover element 290 of the turnkey 206 is engaged with the dial 205 as shown in FIGS. 35-41. FIG. 41 shows the assembled rotary closure 200 from an aerial perspective, the visible components including the flange 210 of the housing 202, the overmolded grip portion 285 of the dial 205 and the cover element 290 of the turnkey 206. As shown, the overmolded grip portion 285 of the dial 205 further includes a plurality of recesses 283 circumferentially defined along the overmolded grip portion 285.

Figure 42:
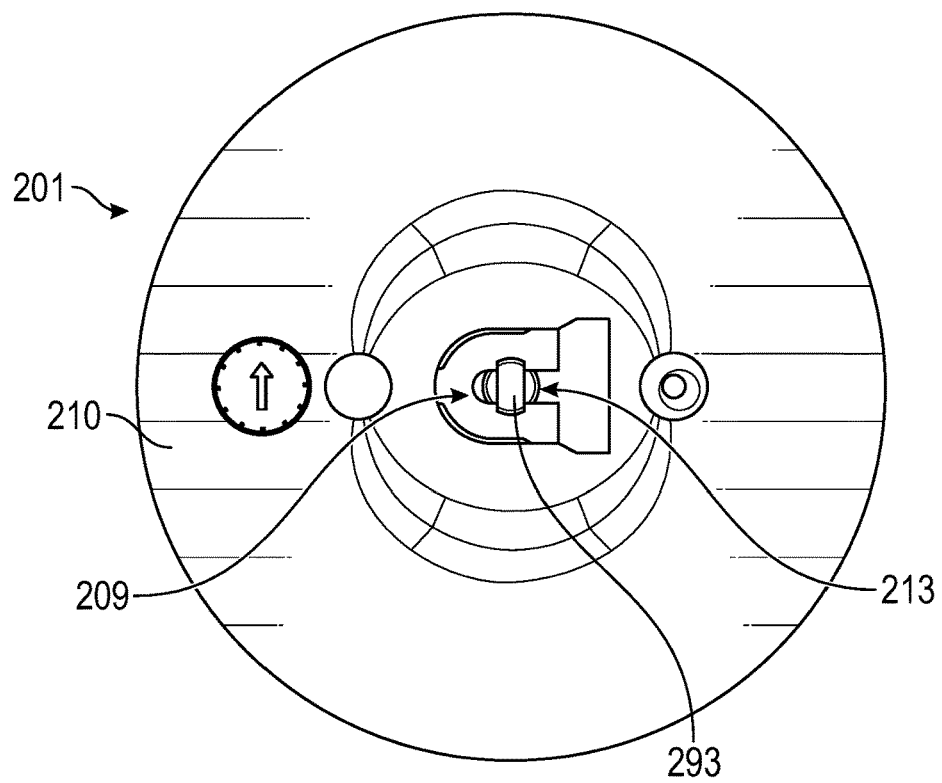
FIG. 42 is a bottom view of the rotary closure of FIG. 35.

An underside perspective of the assembled rotary closure 200 is shown in FIG. 42 including the flange 210 and housing keyway 213 of the housing 202 and the turnkey element 291 of the turnkey 206. In further detail, the housing keyway 213 defines a clip recess 226 for engagement of a clip 209 such that a dual tab 293 of the turnkey element 291 may be inserted through the housing keyway 213 and rotated 90 degrees such that the dual tab 293 slides over the clip 209 and is locked in a snap-fit engagement such that the turnkey element 291 is prevented from being withdrawn from the housing keyway 213 without manual intervention, as shown in FIG. 42. The turnkey element 291 is comprised of a metallic material which slides over the clip 209 and provides vertical retention such that the turnkey element 291 remains latched and cannot be withdrawn without manual intervention. During engagement with the turnkey element 291, the clip 209 flexes laterally outward along a "Y" axis to further engage a pair of lateral extensions 218 of the clip 209 with a pair of alignment recesses 227 defined along the clip recess 226 and allow the dual tab 293 of the turnkey 206 to be rotated into the latched position. Once in the latched position shown in FIG. 71, the clip 209 continues to apply vertical pressure along surfaces 289A and 289B of the dual tab 293 such that the dual tab 293 cannot be removed without manual intervention.

Figure 43:
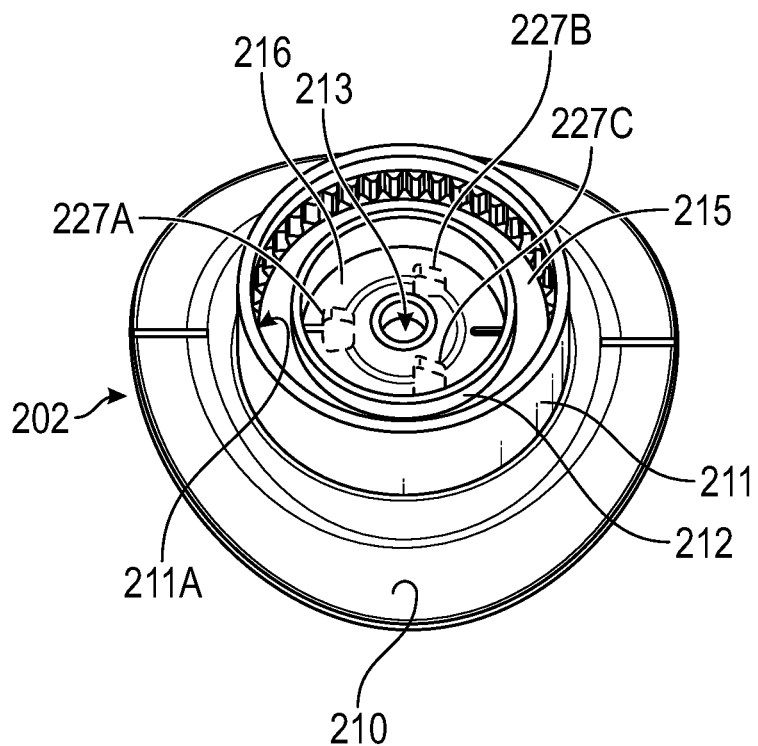
FIG. 43 is a top perspective view of a housing for the rotary closure of FIG. 35.
Figure 44:
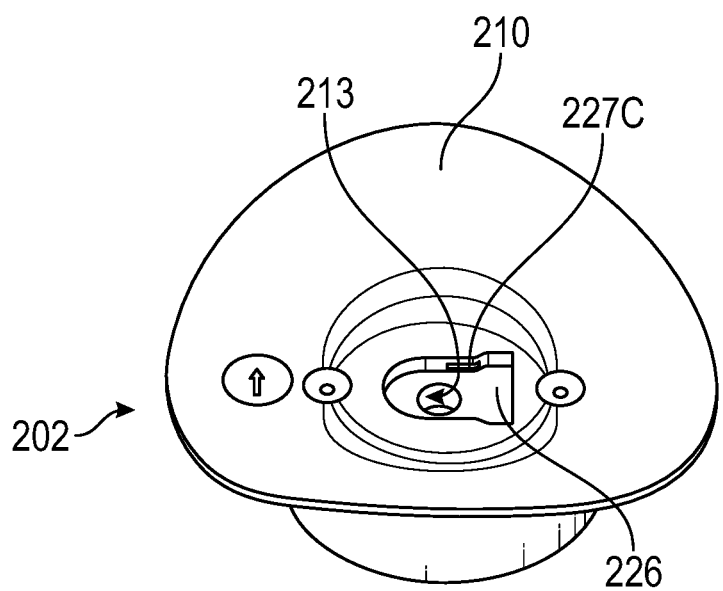
FIG. 44 is a bottom perspective view of the housing.
Figure 45:
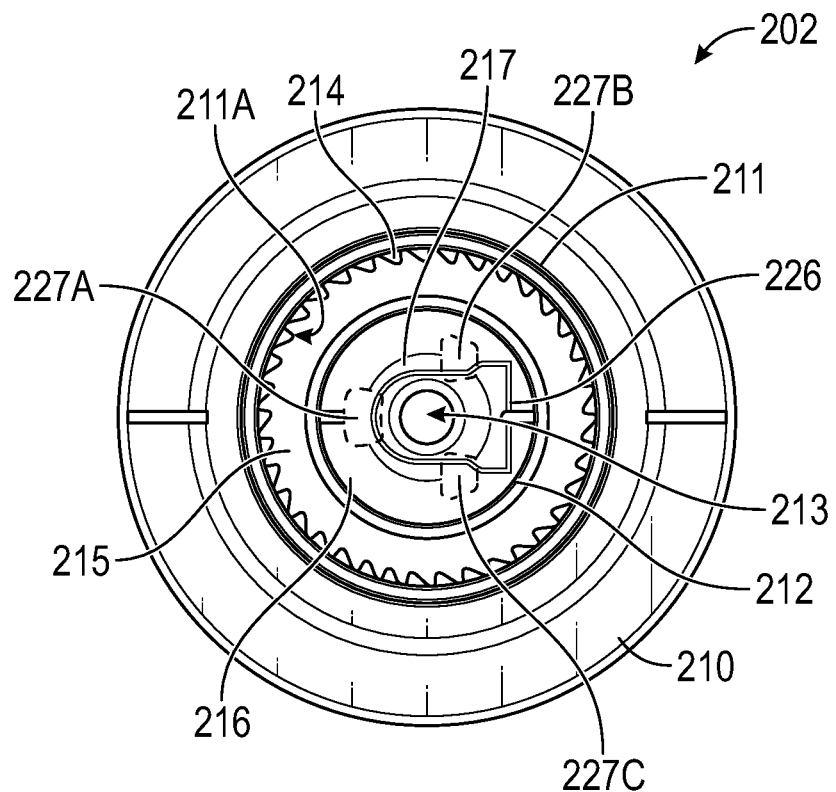
FIG. 45 is a top plan view of the housing.
Figure 46:
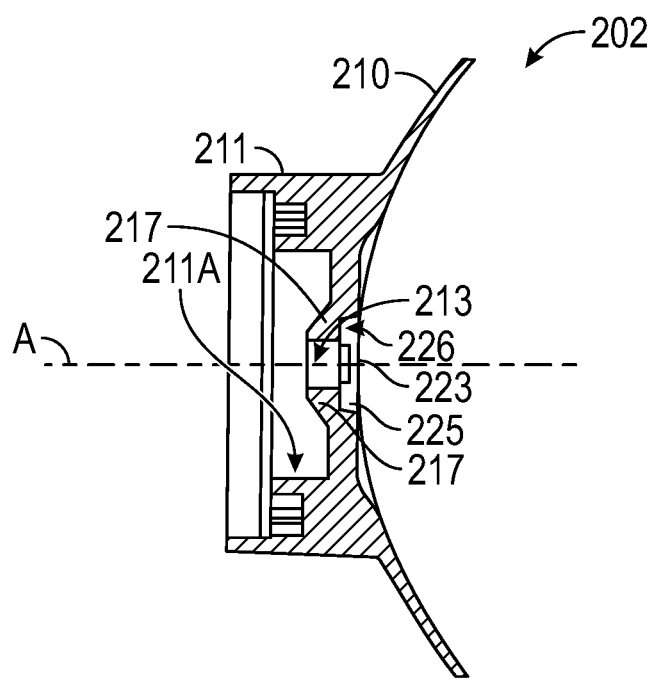
FIG. 46 is a cross sectional view of the housing.

Referring to FIGS. 43-46, the housing 202 for the rotary closure 200 has the saddle-shaped flange 210 and the cylindrical stem 211. In some embodiments shown in FIGS. 43 and 45, the housing 202 further includes an inner circular housing segment 212 defined around the housing keyway 213 oriented around the vertical axis A (FIG. 46). A first circular pathway 215 is defined between the cylindrical stem 211 and the inner circular housing segment 212. FIGS. 43 and 45 further show a plurality of teeth 214 disposed along an interior surface 211A of the stem 211 extending into the first circular pathway 215 which are configured to operatively engage the snap spring assembly 204 as the dial 205 is incrementally rotated in the clockwise or counterclockwise rotational direction Q (FIG. 36), while preventing rotation of the dial 205 in the opposite clockwise or counterclockwise direction R (FIG. 36). A second circular pathway 216 is defined between the inner circular housing segment 212 and the housing keyway 213, where the second circular pathway 216 forms a raised keyway extension 217, as shown in FIG. 45. The raised keyway extension 217 adds structural integrity to the housing keyway 213 and creates room underneath the housing 202 for a set of alignment recesses 227A, 227B, and 227C and the clip recess 226 for insertion of the turnkey 206 shown in FIGS. 43-45. In addition, the raised keyway extension 217 in some embodiments is sized appropriately to meet with a spool base 232 (shown in FIGS. 47, 50, and 51) of the spool 203.

FIG. 44 shows an underside perspective of the housing 202 of the rotary closure 200 having the flange 210, the stem 211 (FIG. 43) and the housing keyway 213, where the housing keyway 213 defines the clip recess 226 for insertion of the clip 209 for engagement with the turnkey 206. FIG. 46 shows the housing including the stem 211 defining a plurality of teeth 214 (FIG. 45) disposed along the interior surface 211A, the flange 210, the housing keyway 213 defining a lateral keyway portion 223, and the clip recess 226. As discussed above, during operation, the turnkey 206 defining the turnkey element 291 is inserted through the lateral keyway portion 223 of the housing keyway 213 and rotated in a clockwise or counterclockwise direction such that the dual tab 293 of the turnkey element 291 is guided over the clip 209 and secured over the clip 209 in a snap-fit engagement.

Figure 47:
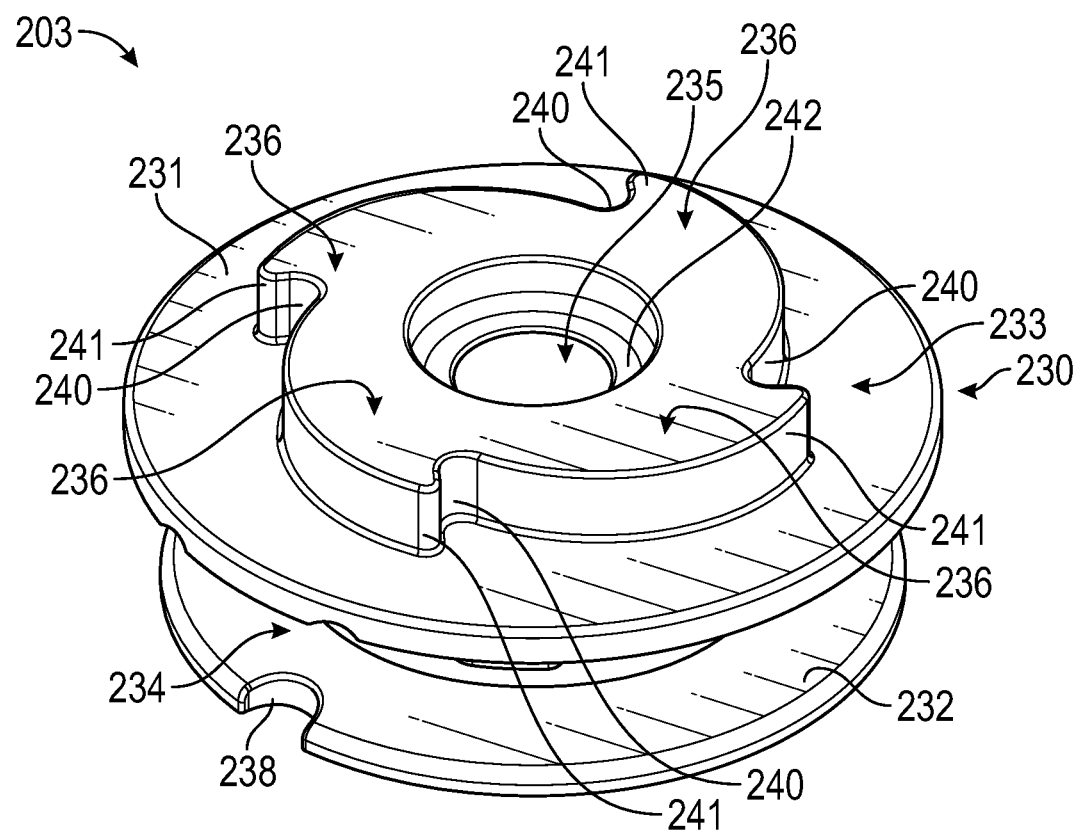
FIG. 47 is a top perspective view of a spool for the rotary closure FIG. 35.
Figure 48:
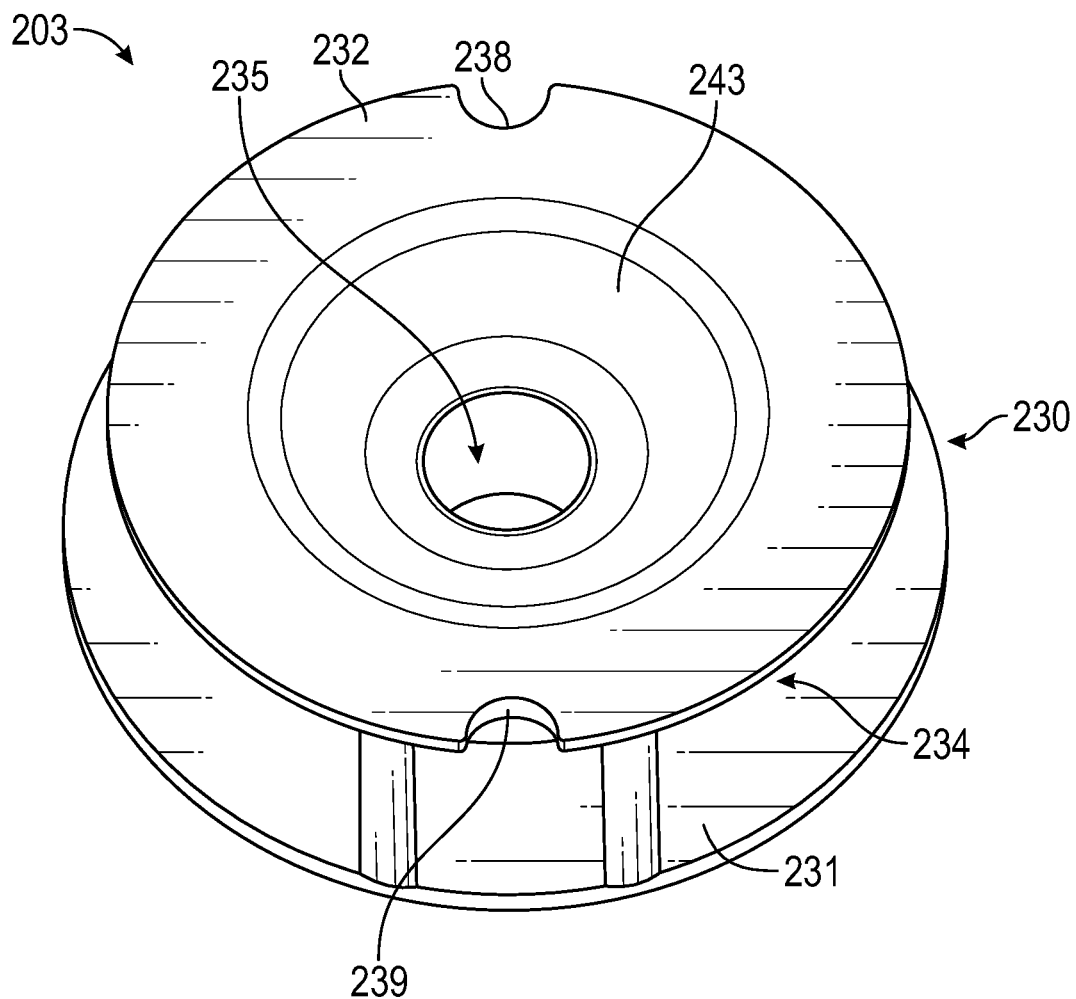
FIG. 48 is a bottom perspective view of the spool.
Figure 49:
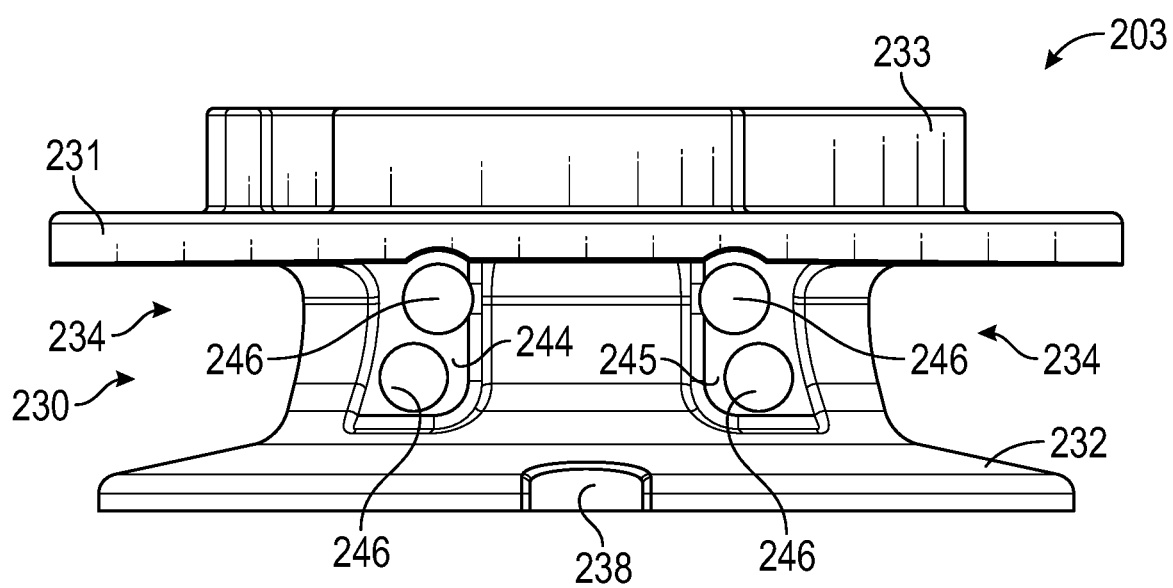
FIG. 49 is a side view of the spool.
Figure 50:
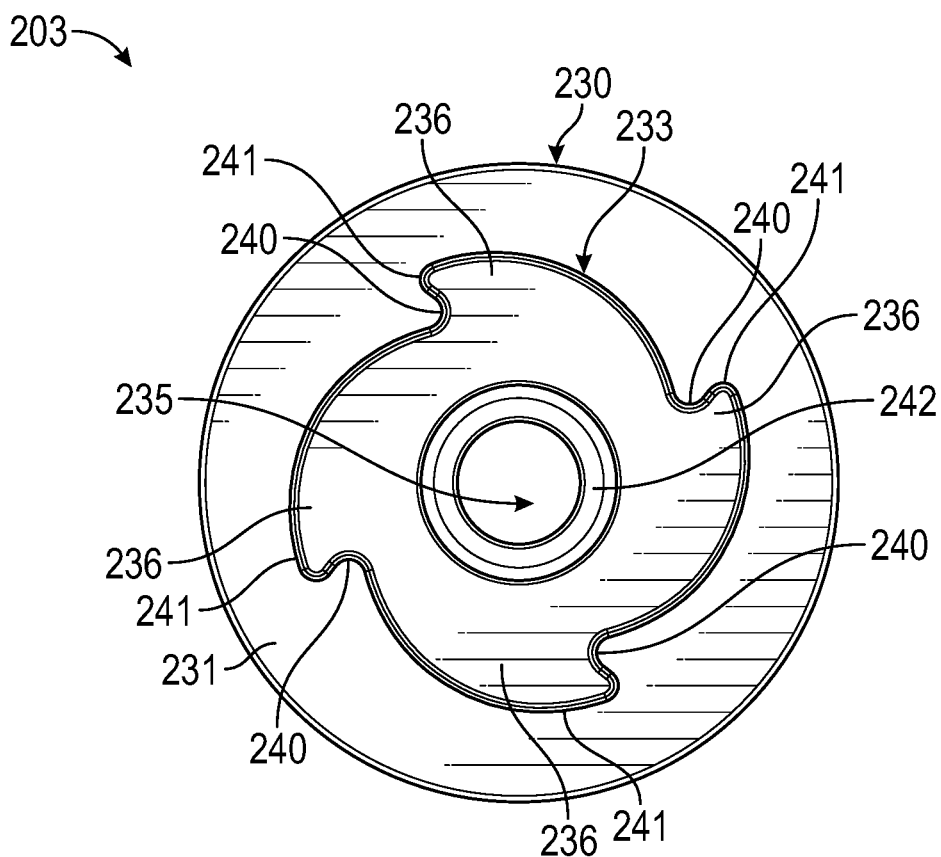
FIG. 50 is a top view of the spool.
Figure 51:
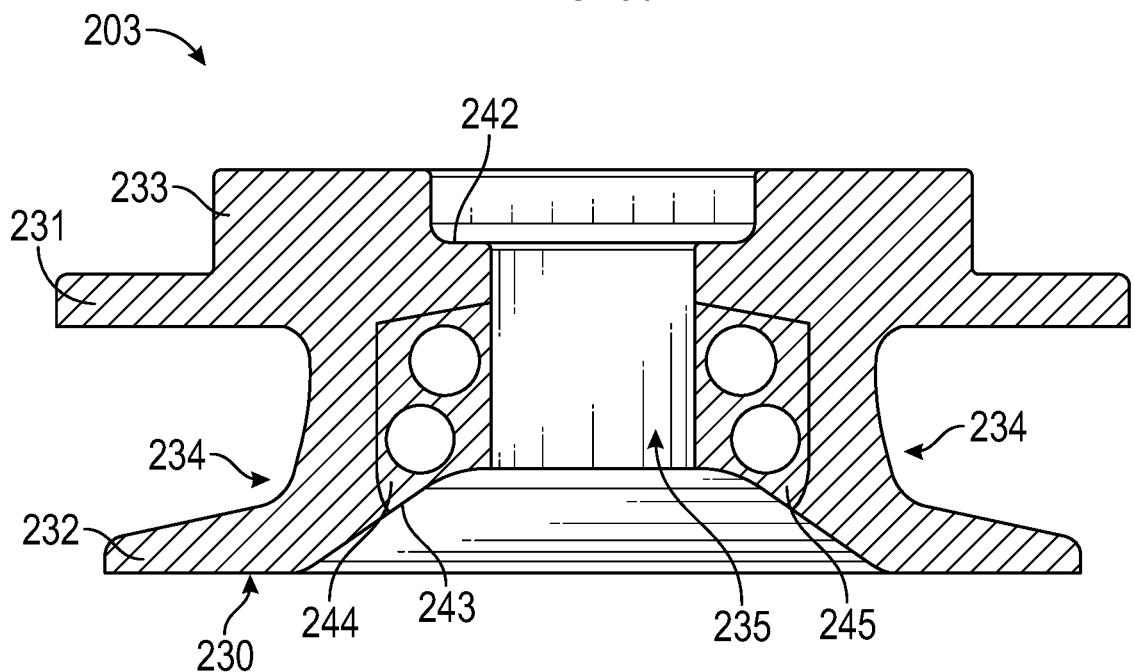
FIG. 51 is a cross-sectional view of the spool.
Figure 52:
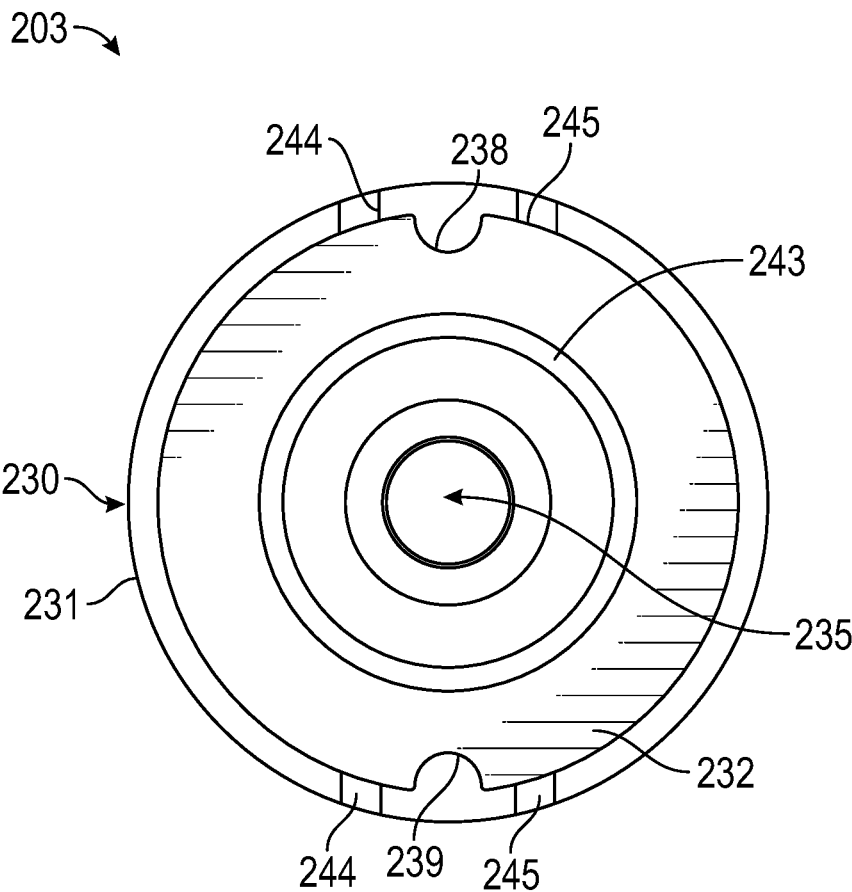
FIG. 52 is a bottom view of the spool showing a second keyway defined by the spool.
Figure 53:
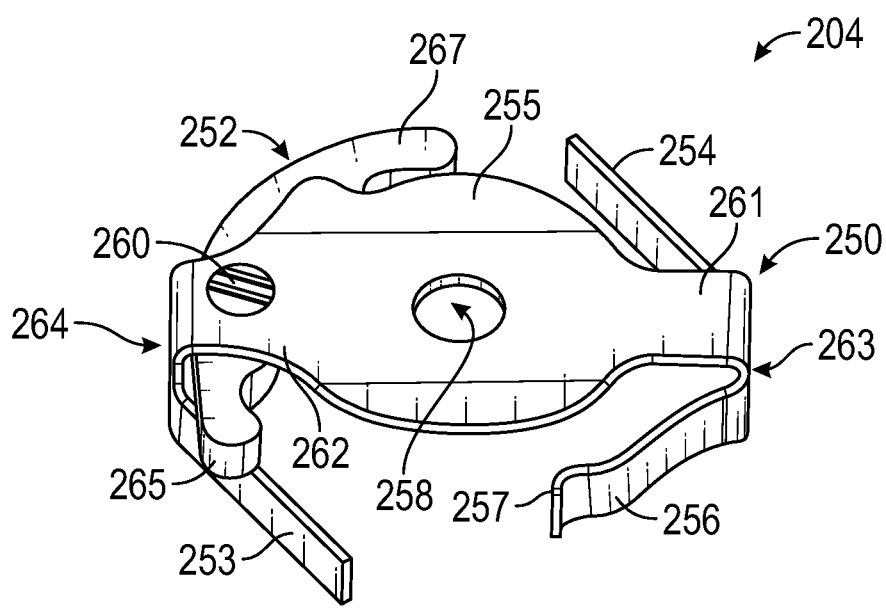
FIG. 53 is a top perspective view of a snap spring assembly for the rotary closure of FIG. 35.
Figure 54:
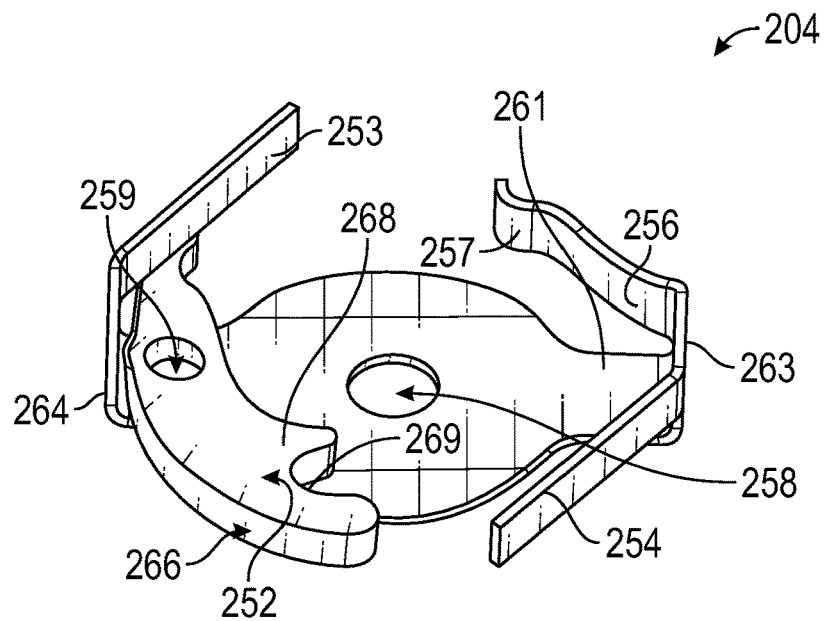
FIG. 54 is a bottom perspective view of the snap spring assembly.
Figure 55:
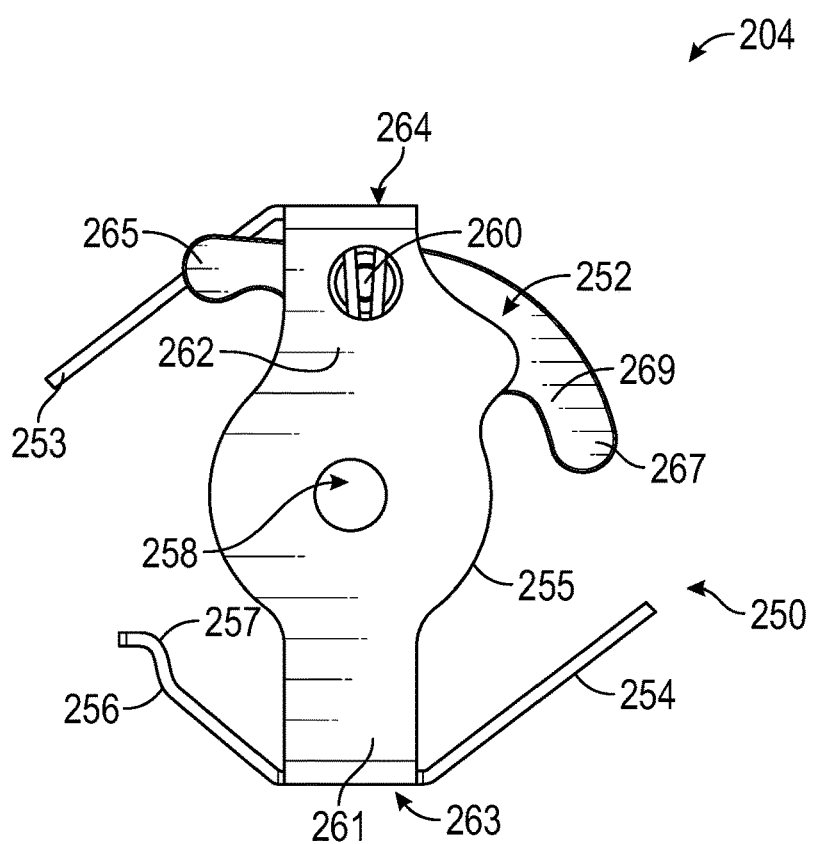
FIG. 55 is a top view of the snap spring assembly.
Figure 56:
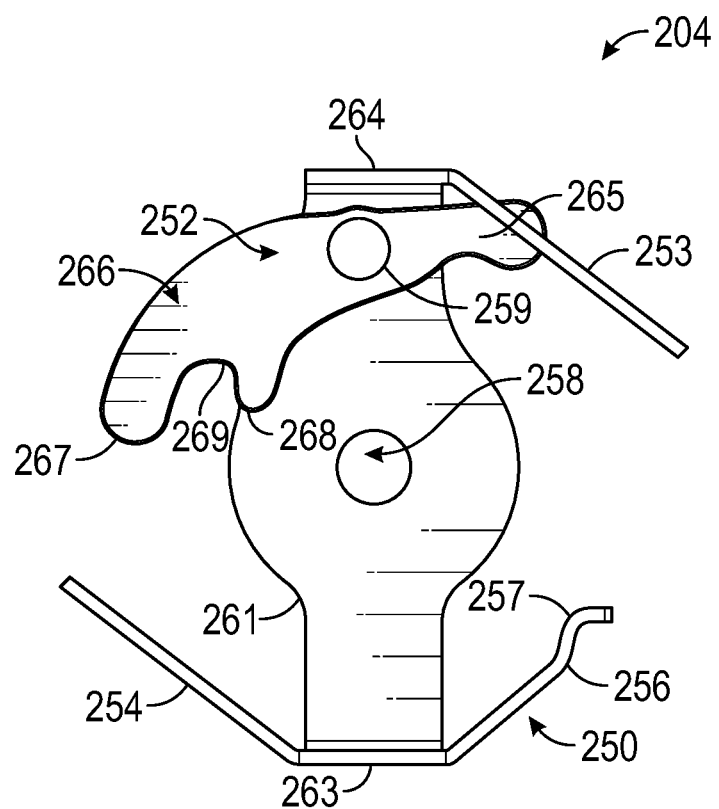
FIG. 56 is a bottom view of the snap spring assembly.
Figure 57:
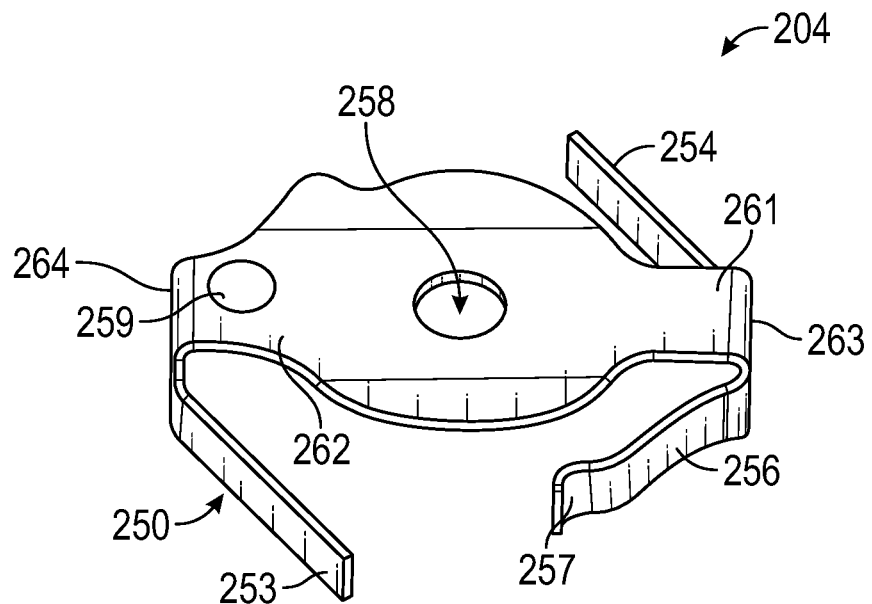
FIG. 57 is a top perspective view of the snap spring assembly with the pawl absent.
Figure 58:
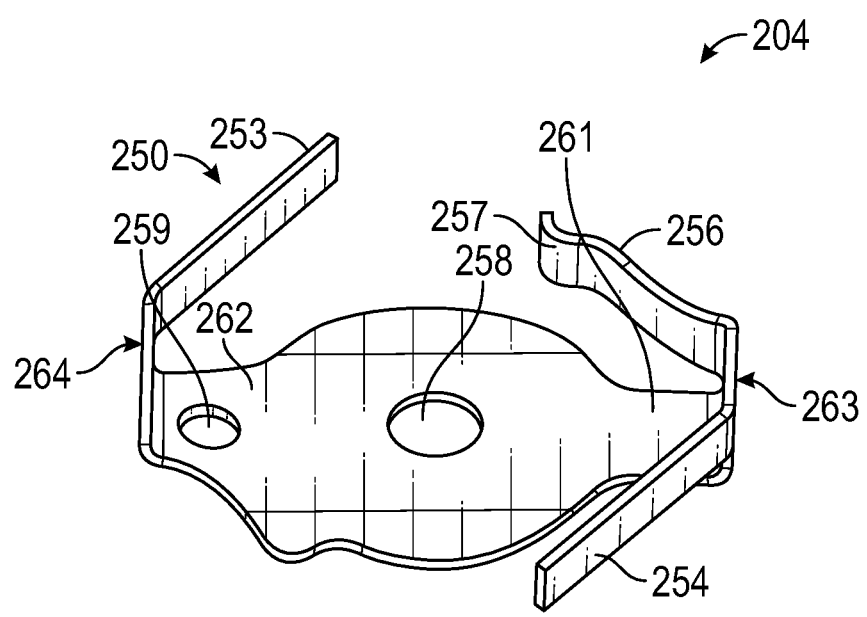
FIG. 58 is a bottom perspective view of the snap spring assembly with the pawl absent.
Figure 59:
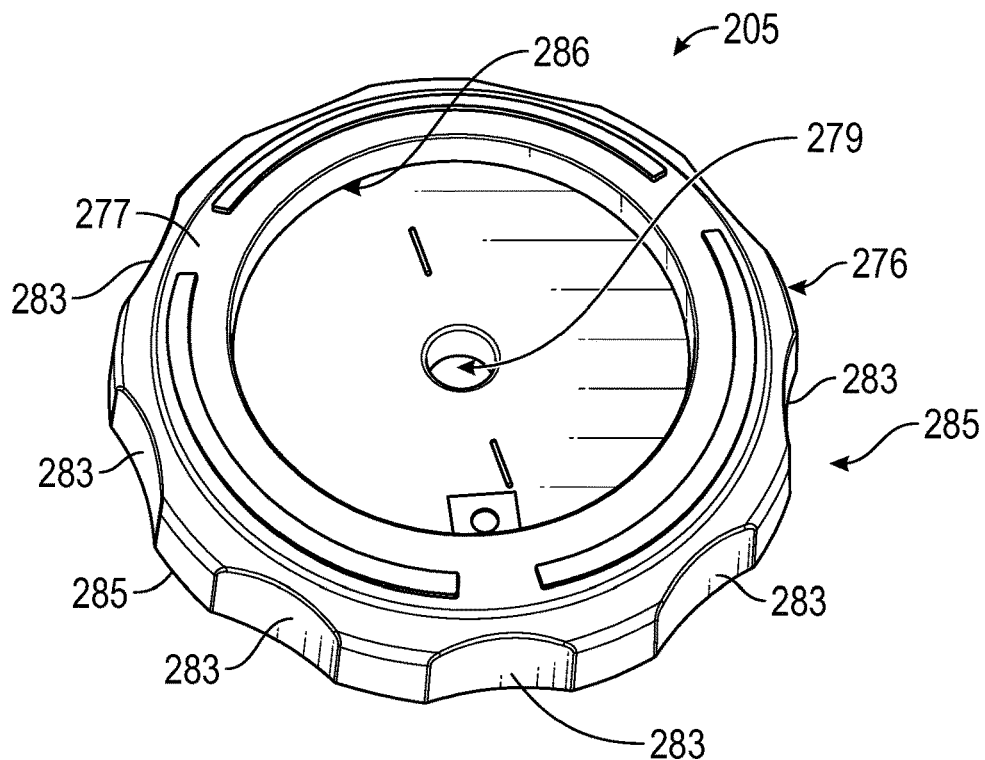
FIG. 59 is a top perspective view of a dial for the rotary closure of FIG. 35.
Figure 60:
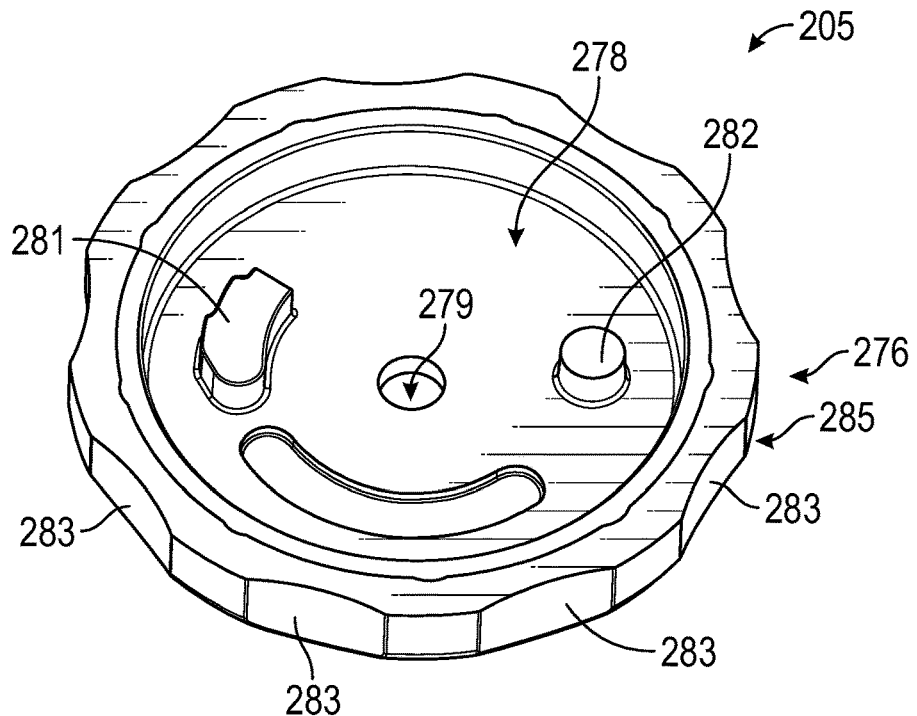
FIG. 60 is a bottom perspective view of the dial.
Figure 61:
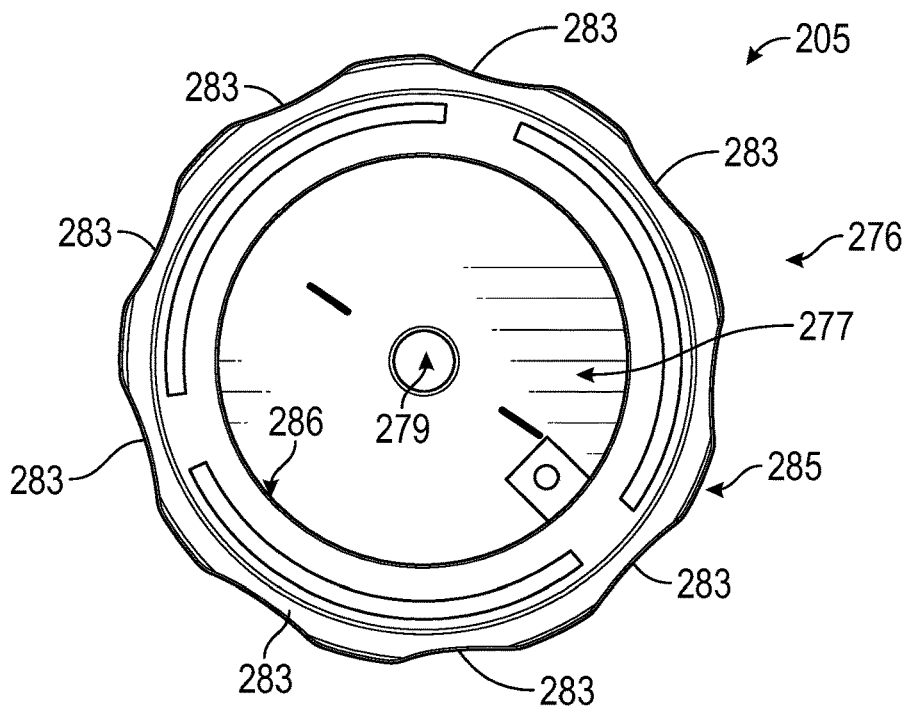
FIG. 61 is a top view of the dial.
Figure 62:
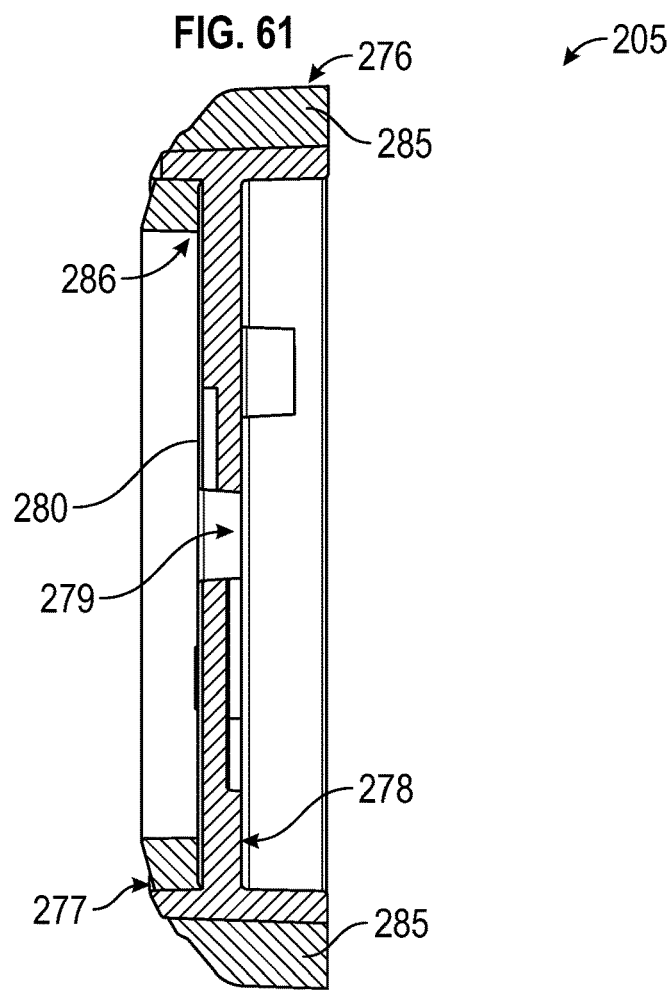
FIG. 62 is a cross-sectional view of the dial for the rotary closure of FIG. 35.
Figure 63:
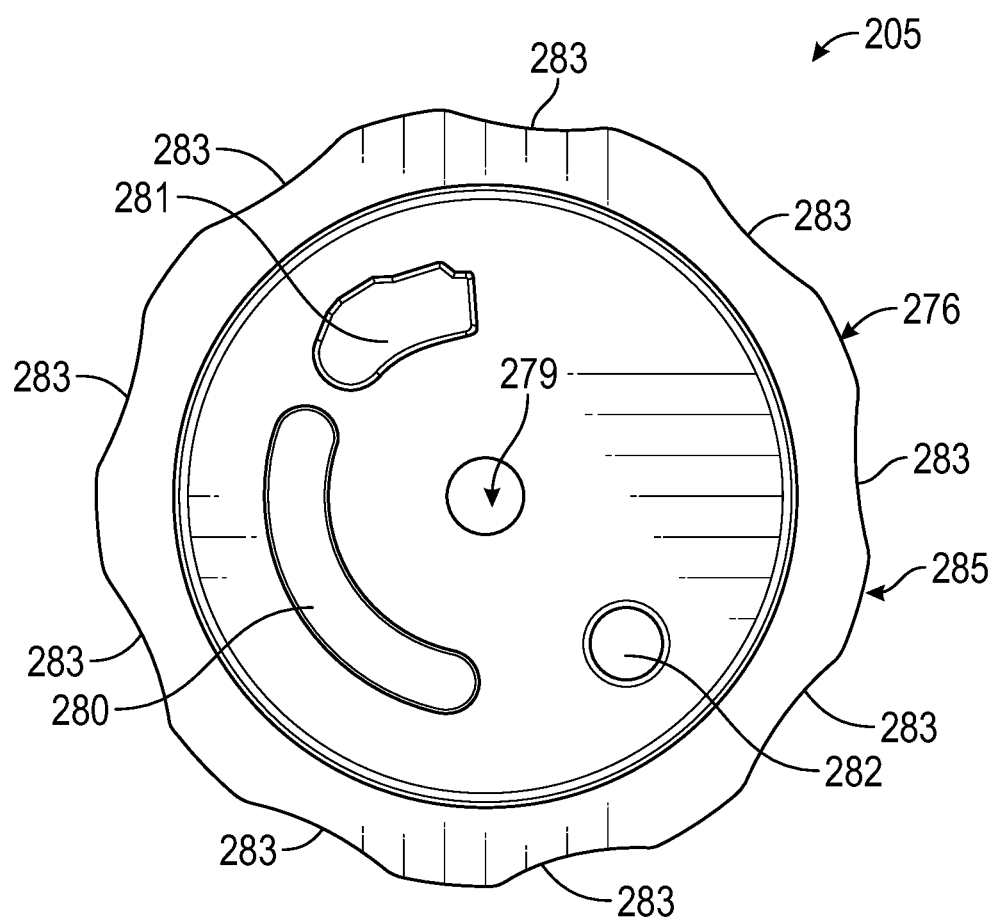
FIG. 63 is a bottom view of the dial.

One embodiment of the spool 203 of the rotary closure 200 is shown in FIGS. 47-52, where the spool 203 controls the operation of a tensioning element 246 (FIG. 49), used to lace a shoe (not shown) by operation of the rotary closure 200 and is seated within the inner circular housing segment 212 of the housing 202. The spool 203 includes a body 230 forming a spool base 232 and a spool flange 231 that collectively define a channel 234 between the spool base 232 and the spool flange 231. As shown in FIG. 47, a spool extension 233 extends from the spool flange 231 and defines a plurality of teeth 236 having alternating recesses 240 and ridges 241 for engagement of the snap spring assembly 204 (a mechanism which will be described in further detail below) such that the spool 203 is rotated in the clockwise or counterclockwise direction Q (FIG. 36) and is prevented from rotating in the opposite clockwise or counterclockwise direction R (FIG. 36). As shown in FIG. 47, the spool 203 further includes a spool shoulder 242 defined between an interior of the spool extension 233 and the spool keyway 235 formed axially through the body 230 of the spool 203 for insertion of the turnkey 206. The spool base 232 shown in FIG. 47 further defines a first arcuate slot 238 for allowing passage of the tensioning element 246 during assembly of the rotary closure 200. As shown in FIGS. 48, 51 and 52, the spool base 232 further defines a spool well 243 terminating in the spool keyway 235 and a second arcuate slot 239 situated opposite from the first arcuate slot 238 that also allows passage of the tensioning element 246 during assembly of the rotary closure 200. FIG. 49 illustrates a first spool window 244 and a second spool window 245 defined along the channel 234 such that tensioning elements 246 are disposed within and wound inside the channel 234 around the spool 103.

During operation of the latching system 201, as shown in FIG. 36, the spool base 232 of the spool 203 is disposed within the inner circular housing segment 212 of the housing 202 such that the spool extension 233 engages with the snap spring 204. The spool keyway 235 is aligned with the housing keyway 213 of the housing 202 such that the turnkey element 291 of the turnkey 206 may be inserted through both the housing keyway 213 and the spool keyway 235 simultaneously.

Referring to FIGS. 53-58, the snap spring assembly 204 of the rotary closure 200 includes a body 250 having a center portion 255 forming a first lateral arm 261 and a second lateral arm 262 situated opposite to the first lateral arm 261. The first lateral arm 261 defines a first shoulder 263 and a first spring 254 extending laterally from the first shoulder 263. The first shoulder further defines a second spring 256 having a curved terminal end 257 protruding laterally from an opposite side of the first shoulder 263. The second lateral arm 262 defines a second shoulder 264 and a third spring 253 situated opposite from the second spring 256. The snap spring assembly 204 further includes a pawl 252 in engagement with the second lateral arm 262 by a pivot element 260, where the second lateral arm 262 defines an aperture 259 to receive the pivot element 260. In some embodiments shown in FIGS. 53-56, the pawl 252 defines a proximal portion 265 and an opposite distal portion 266 such that the distal portion 266 forms a first ridge 267 and a second ridge 268 with a recess 269 defined between ridges 267 and 268. As shown in FIG. 36, the pawl 252 is configured for engagement with one of the plurality of teeth 236 of the spool extension 233 of the spool 203 and is operable to pivot about the pivot element 260 when the spool 203 is rotated.

During operation, the recess 269 of the pawl 252 is configured to engage a respective ridge 241 of the spool extension 233 such that rotation of the spool 203 is controlled by the pawl 252, allowing rotation of the spool 203 in the clockwise or counterclockwise direction Q (FIG. 36) but not in the opposite clockwise or counterclockwise direction R (FIG. 36). The first spring 253 and the second spring 254 of the snap spring assembly 204 are each configured to incrementally engage one of the plurality of teeth 214 of the housing 202 as the dial 205 is rotated by the user. In addition, the third spring 256 having the terminal end portion 257 also engages one of the plurality of teeth 214 such that counter-rotation of the snap spring assembly 204 is prevented when the dial 205 is rotated in the opposite clockwise or counterclockwise direction R by the user. As shown, the snap spring keyway 258 is formed through the center portion 255 of the snap spring assembly 204 along axis A (FIG. 36) and is in coaxial alignment and communication with the housing keyway 213 and the spool keyway 235 for the insertion of a turnkey 206 for operation of the latching system 201.

As illustrated in FIGS. 59-63, the dial 205 provides a means for turning the rotary closure 200, the dial 205 having a dial body 276 defining an exterior surface 277 and an interior surface 278 with the dial keyway 279 formed axially through the dial 205. In some embodiments, the exterior surface 277 of the dial 205 includes an overmolded grip portion 285 having a plurality of respective grip recesses 283 formed equidistantly along the overmolded grip portion 285 for comfortable manual rotation of the dial 205. The exterior surface 277 further defines a circular recess 286 (FIGS. 59 and 61) such that the cover element 290 of the turnkey 206 rests within the circular recess 286 when assembled, as shown in FIG. 36. The interior surface 278 defines a raised post 282, where the post 282 is configured to engage with the proximal portion 265 of the pawl 252 when the dial 205 is turned in the clockwise or counterclockwise direction Q (FIG. 36), causing the pawl 252 to pivot about the pivot element 260, thereby causing the pawl 252 to engage with one of the plurality of teeth 236 of the spool 203 and causing the spool 203 to rotate. The interior surface 278 further defines a raised extension 281 and a curved recess 280 in which the curved recess 280 defines a clearance area that permits the pivot element 260 of the snap spring assembly 204 to freely move during operation of the rotary closure 200. As shown in FIG. 36, during operation of the latching system 201 of the rotary closure 200 the dial keyway 279 is in axial alignment with the snap spring keyway 258, the spool keyway 235 and the housing keyway 213 for insertion of the turnkey 206.

Figure 64:
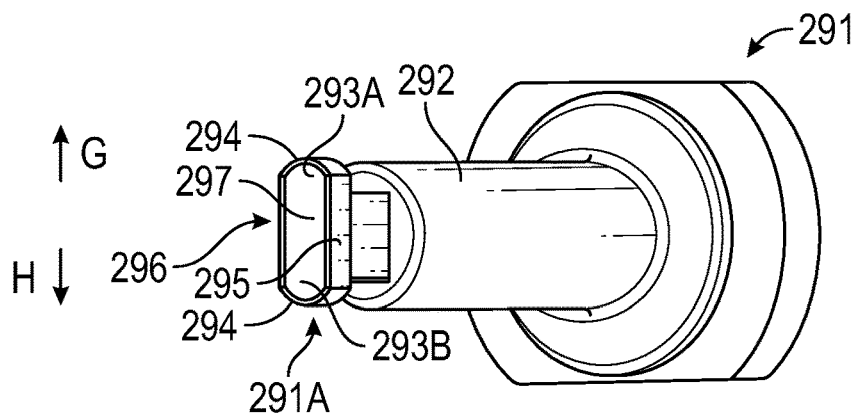
FIG. 64 is a bottom perspective view of a turnkey for the rotary closure of FIG. 35.
Figure 65:
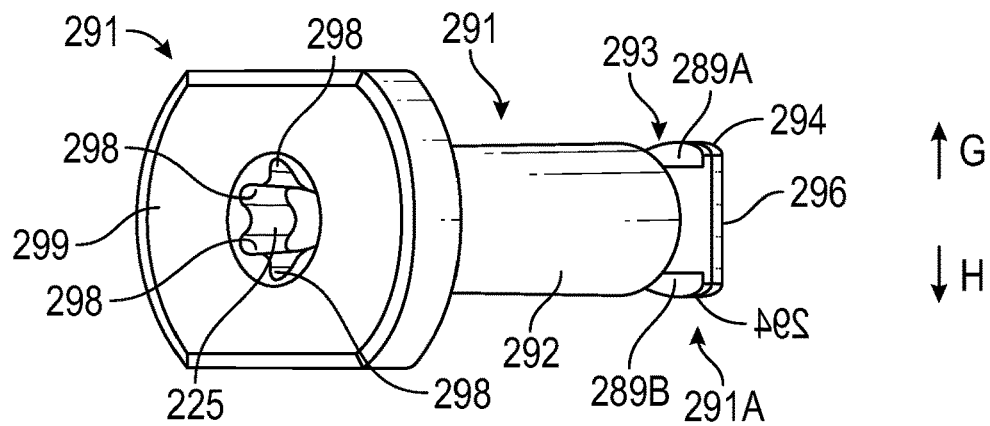
FIG. 65 is a top perspective view of the turnkey.
Figure 66:
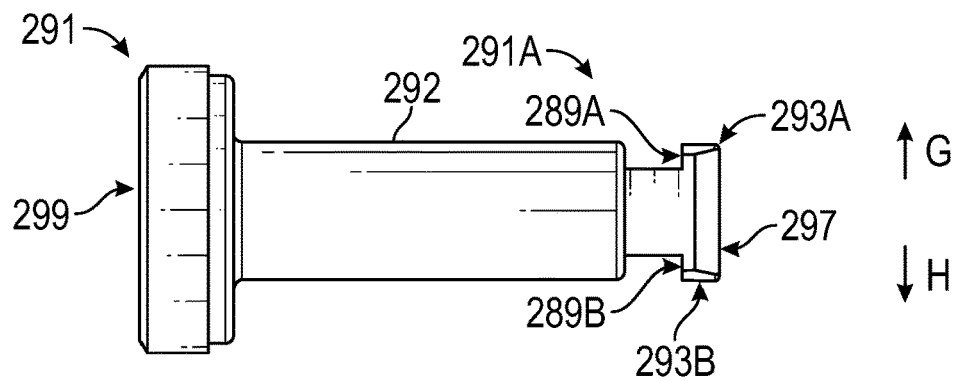
FIG. 66 is a side view of the turnkey.

Referring to FIGS. 64-66, the turnkey 206 provides a means for latching various components of the rotary closure 200 together in an assembled state when in the latched position. The turnkey 206 includes the turnkey element 291 terminating in a free end 291A, wherein the turnkey element 291 forms a top surface 299 (FIG. 65), an axial portion 292, and a dual tab 293 formed at the free end 191A. The top surface 299 of the turnkey element 291 defines an engagement recess 225 configured to engage with the cover 208. The engagement recess 225 may comprise a set of gripping recesses 298 aligned to further engage with the cover 208. The axial portion 292 of the turnkey element 291 may be of any shape and dimensions suitable to engage through the dial keyway 179, the snap spring keyway 158, the spool keyway 135 and the housing keyway 113. In some embodiments, the axial portion 292 may define a cylindrical shape or a half-cylindrical shape. As shown in FIG. 64, the dual tab 293 may define a first tab 293A and a second tab 293B with the first tab 293A extending perpendicular to the axial portion 292 of the turnkey element 291 in a direction G and the second tab 293B extending perpendicular to the axial portion 292 of the turnkey element 291 in an opposite direction H. The first tab 293A includes a first upper surface 289A and the second tab 293B includes a second upper surface 289B. The dual tab 293 further includes a bottom side 297, opposite curved faces 294, a first side 295, and a second side 296. The first side 295 and the second side 296 may have flat faces such that the bottom side 297 defines a flat oval shape whose longest diameter is equal to the diameter of the axial portion 292.

Figure 31:
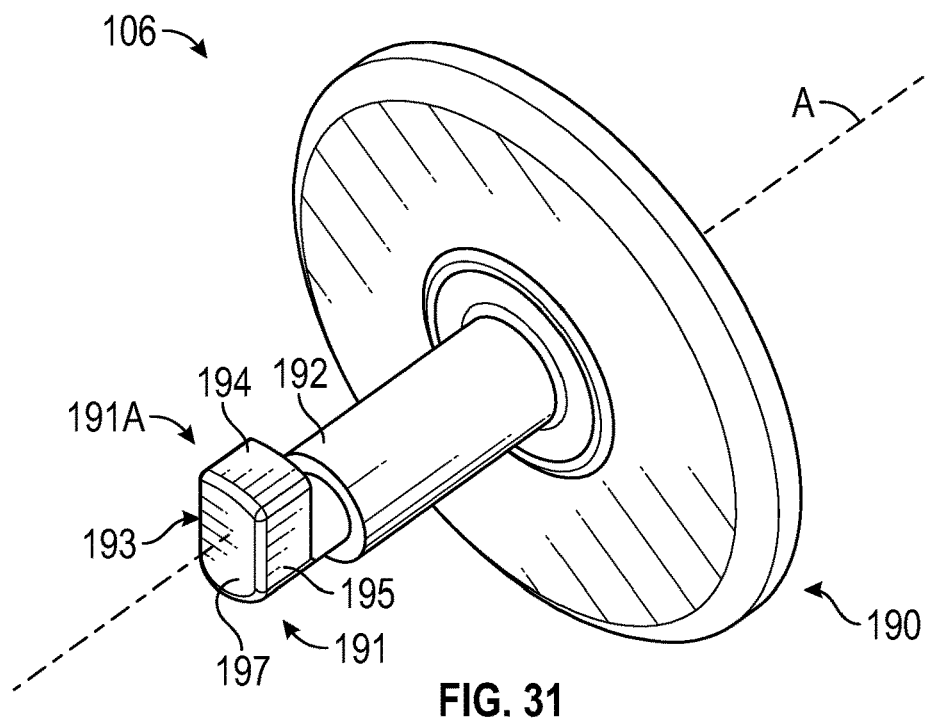
FIG. 31 is a bottom perspective view of the turnkey.
Figure 32:
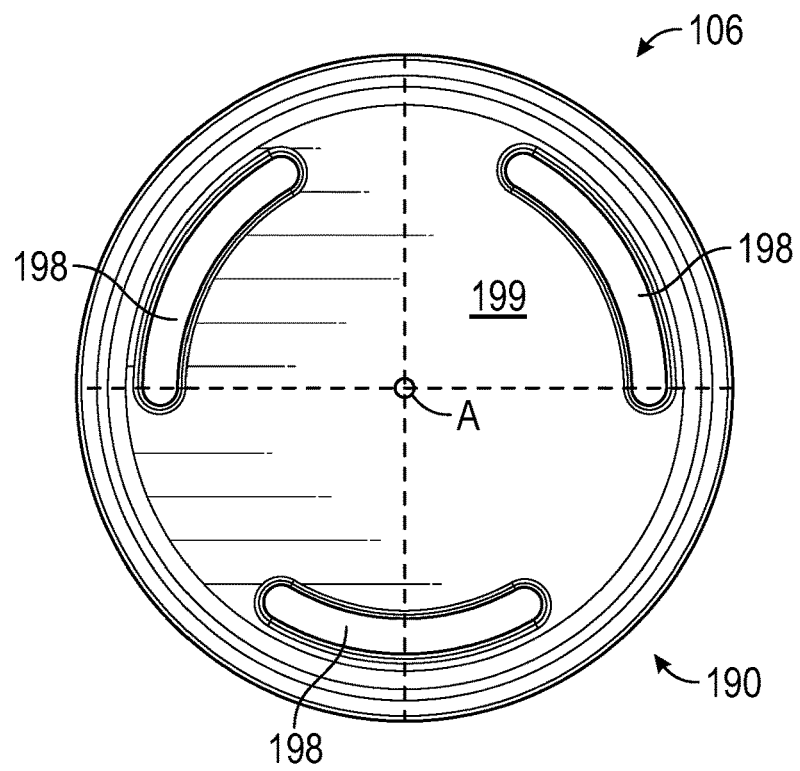
FIG. 32 is a top view of a cover element for the turnkey.
Figure 33:
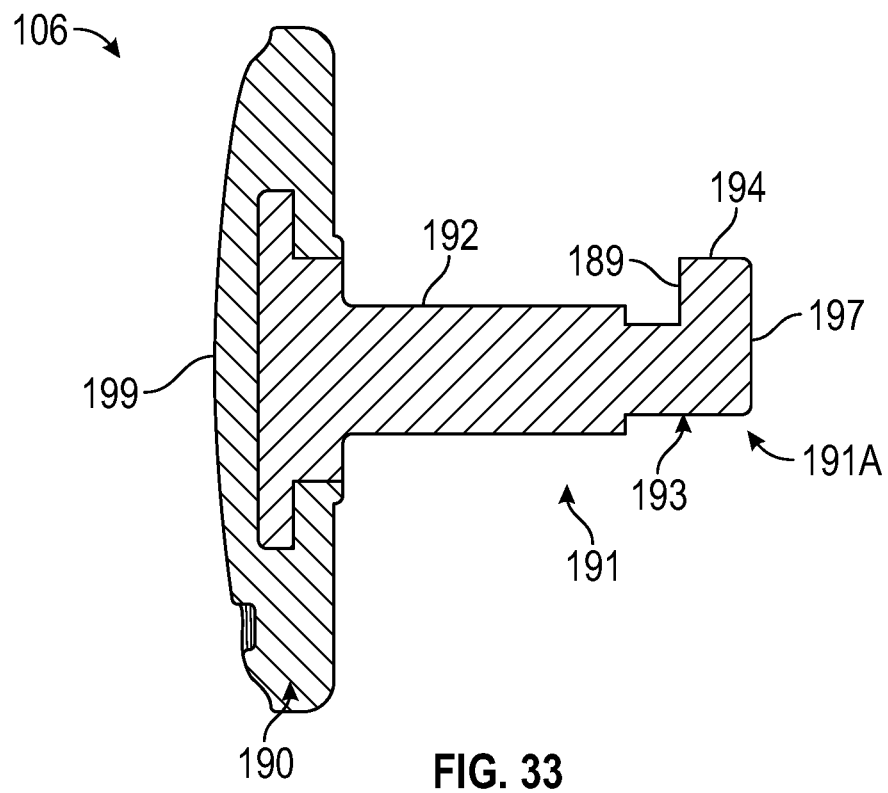
FIG. 33 is a cross sectional view of the turnkey.
Figure 34:
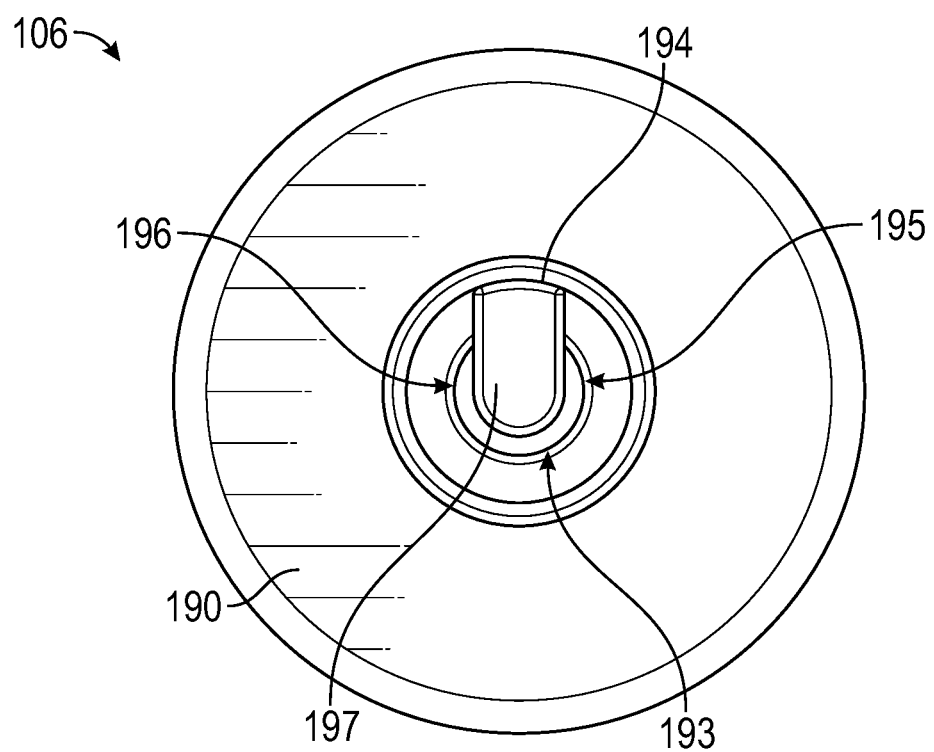
FIG. 34 is a bottom view of the turnkey.

An important distinction between the turnkey 206 of the rotary closure 200 and the turnkey 106 of the rotary closure 100 is that the dual tab 293 of the turnkey 206 extends in opposite directions perpendicular to the axial portion 292 of the turnkey 200 as shown in FIGS. 64-66, while the tab 193 of the turnkey 106 extends in one direction only perpendicular to the axial portion 192 of the turnkey 100, as shown in FIGS. 31, 33, and 34.

Figure 67:
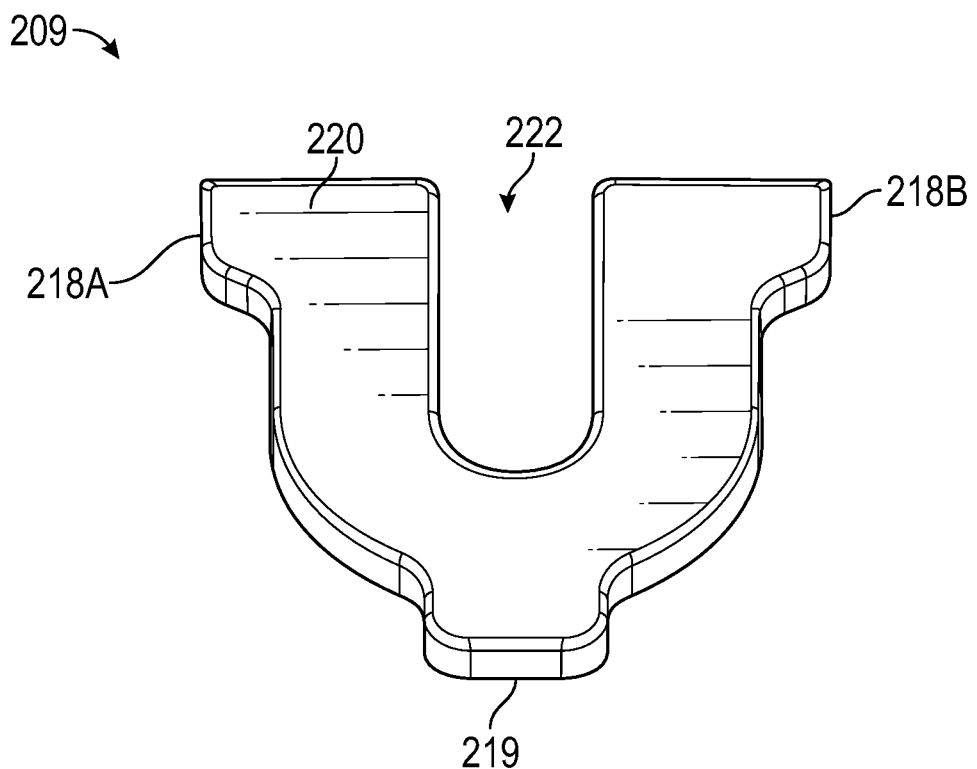
FIG. 67 is a front perspective view of a clip for the rotary closure of FIG. 35.
Figure 68:
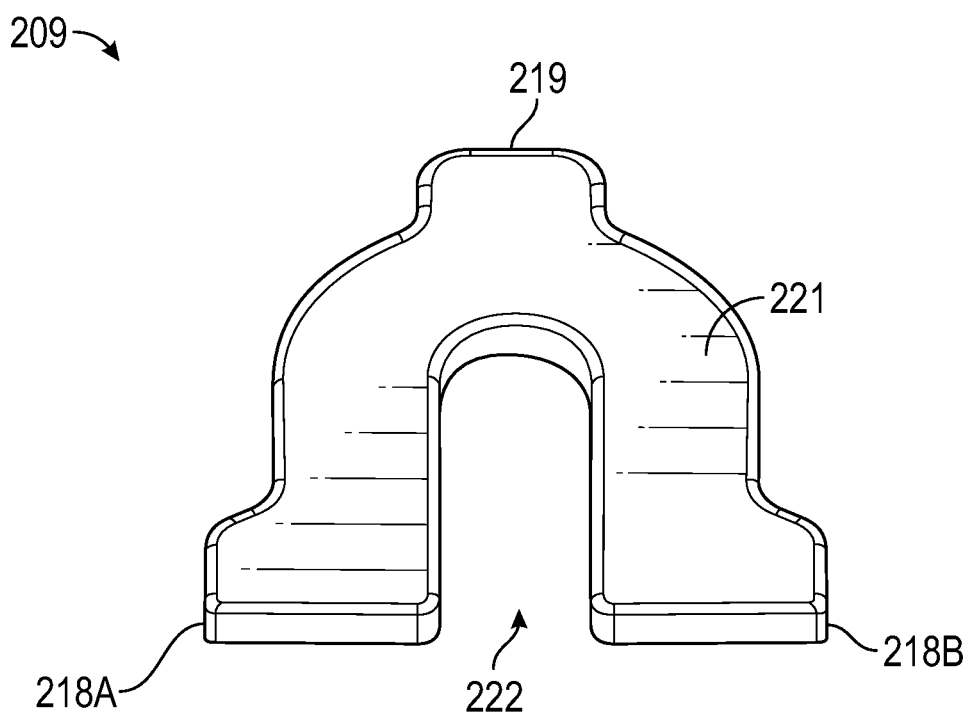
FIG. 68 is a rear perspective view of the clip for the latching system.
Figure 69:
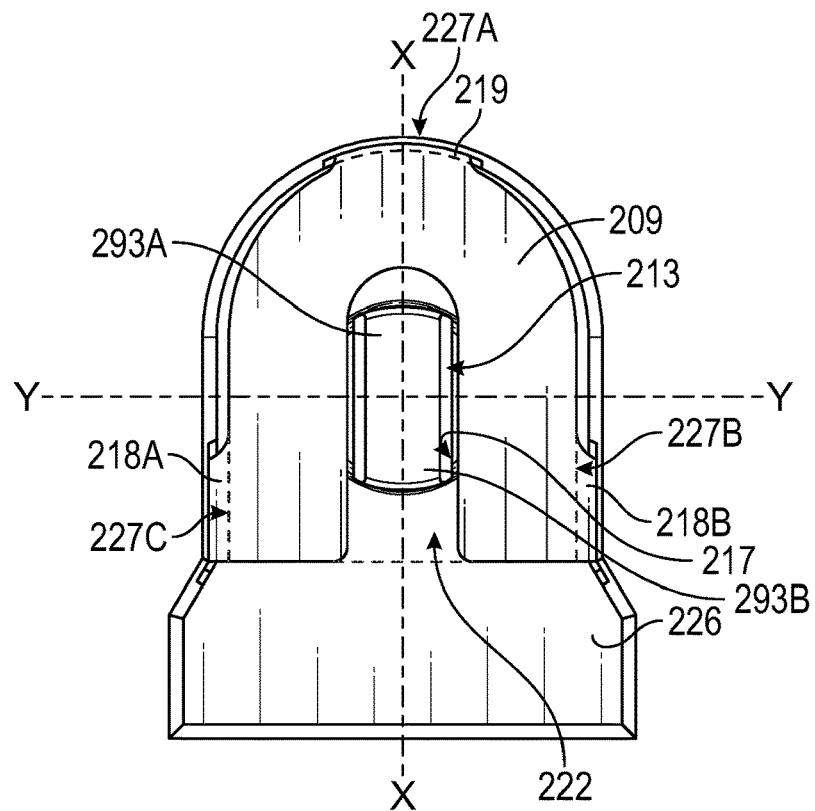
FIG. 69 is a bottom view of the clip engaged within a clip recess of the rotary closure of FIG. 35 wherein the turnkey is in an unlatched position.
Figure 70:
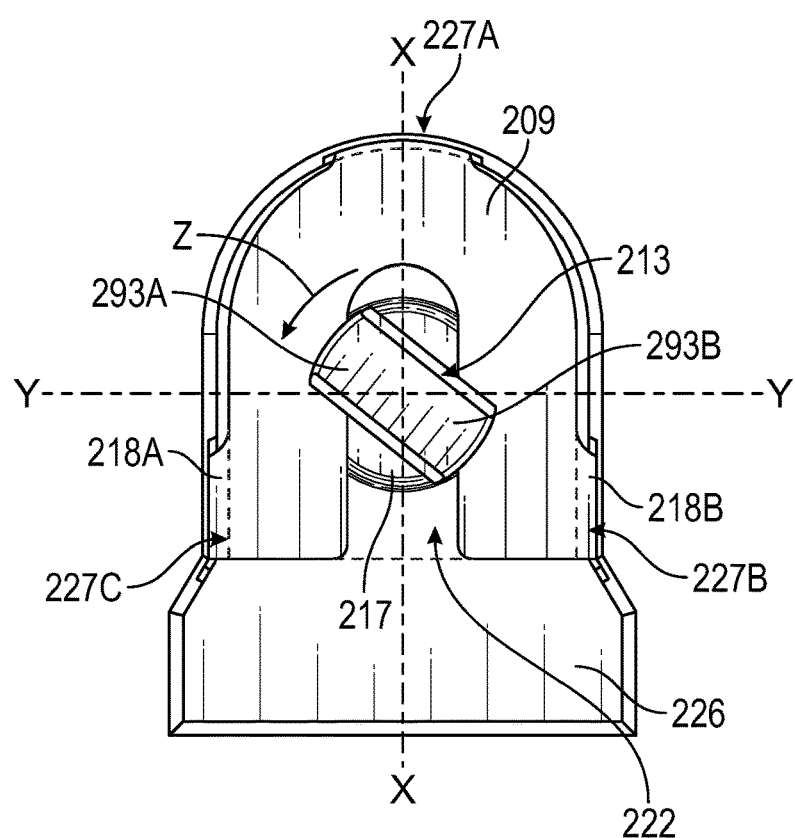
FIG. 70 is a bottom view of the clip engaged in the clip recess wherein the turnkey is in a partially latched position.
Figure 71:
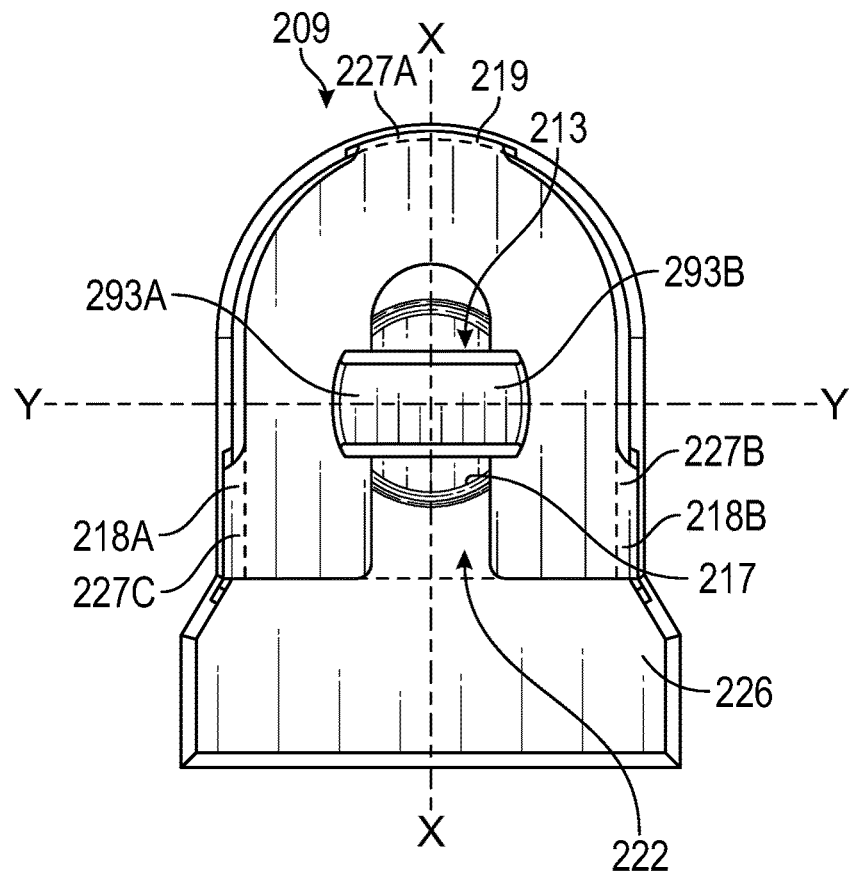
FIG. 71 is a bottom view of the clip engaged in the clip recess wherein the turnkey is in a fully latched position.

FIGS. 67-73 illustrate the clip 209 and/or the clip recess 226 defined along the housing 202 configured to receive the clip 209 therein. As shown in FIG. 69 the clip 209 may be engaged within the clip recess 226 defined along the flange 210 of the housing 202 (shown in FIGS. 72 and 73). In particular, the clip recess 226 is defined by the housing keyway 213 and is configured to receive the clip 209 therein. In some embodiments of the rotary closure 200, the dual tab 293 of the turnkey element 291 engages the clip 209. As shown in FIGS. 69-71, the clip recess 226 is defined by the housing keyway 213 having the keyway extension 217, which in some embodiments may define a circular shape. In some embodiments, the clip recess 226 may be located such that it is centered relative to the three alignment recesses 227A, 227B and 227C formed along the peripheral edge of the clip recess 226. In some embodiments, the clip recess 226 is sized to securely receive the clip 209. In operation, the clip 209 provides a means for securing the dual tab 293 of the turnkey 206 when the turnkey 206 has been inserted entirely through the housing keyway 213, the spool keyway 235, the snap spring keyway 258 and the dial keyway 279 of the rotary closure 200 and then rotated 90 degrees such that the turnkey 206 cannot be disengaged from the housing keyway 213 without manual intervention. While the dual tab 293 of the turnkey is being rotated, the lateral extensions 218 of the clip 209 are pushed further laterally into two of the alignment recesses 227 to prevent disengagement of the clip 209 from the clip recess 226.

Figure 72:
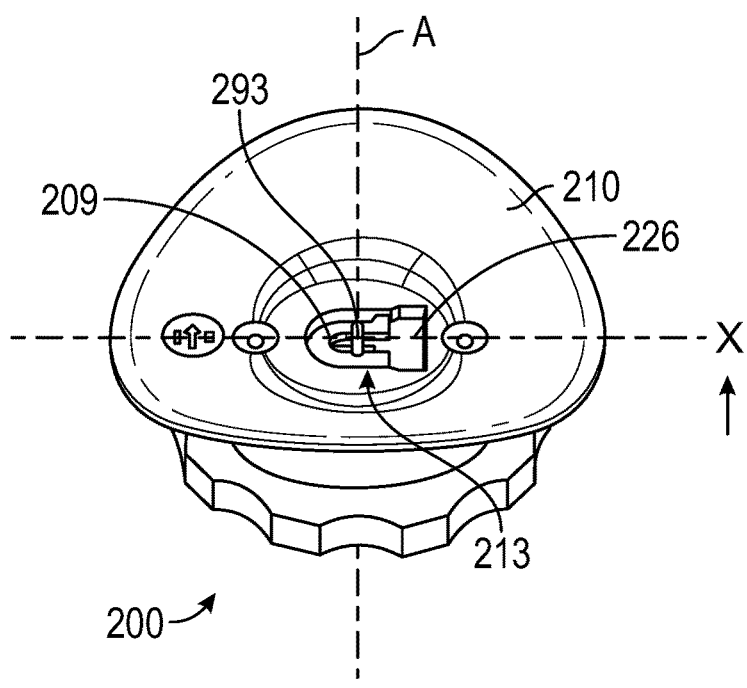
FIG. 72 is a bottom perspective view of the housing showing the clip engaged in the clip recess and the turnkey engaged in a latched position.

In some embodiments, the clip 209 may define a generally horseshoe-shaped configuration comprising a first surface 220 and a second surface 221 formed opposite the first surface 220. The clip 209 may further define a medial extension 219 formed equidistant from at least two lateral extensions 218 extending opposite one another and perpendicular to the direction of extension of the medial extension 219 of the clip 209. The two lateral extensions 218 may define the respective lateral side extensions 218A and 218B to provide secure coupling between the clip 209 and the clip recess 226. As shown in FIG. 72, the lateral extensions 218A and 218B and the medial extension 219 may securely engage with the respective alignment recesses 227C, 227B, and 227A to securely couple the clip 209 within the clip recess 226. As shown in FIGS. 67 and 68, the clip 209 further defines a slot 222 centered between the lateral extensions 218. The slot 222 is configured for alignment with the lateral keyway portion 223 of the housing keyway 213. The configuration of the slot 222 is suitable for insertion of the dual tab 293 of the turnkey element 291 therethrough once the turnkey element 291 is inserted entirely through the housing keyway 213. Rotation of the turnkey element 291 90 degrees in a rotational direction Z (FIG. 70) such that the dual tab 293 rides over the body of the clip 209, as sequentially shown in FIGS. 69-71, and more securely couples the clip 209 within the clip recess 226.

Figure 73:
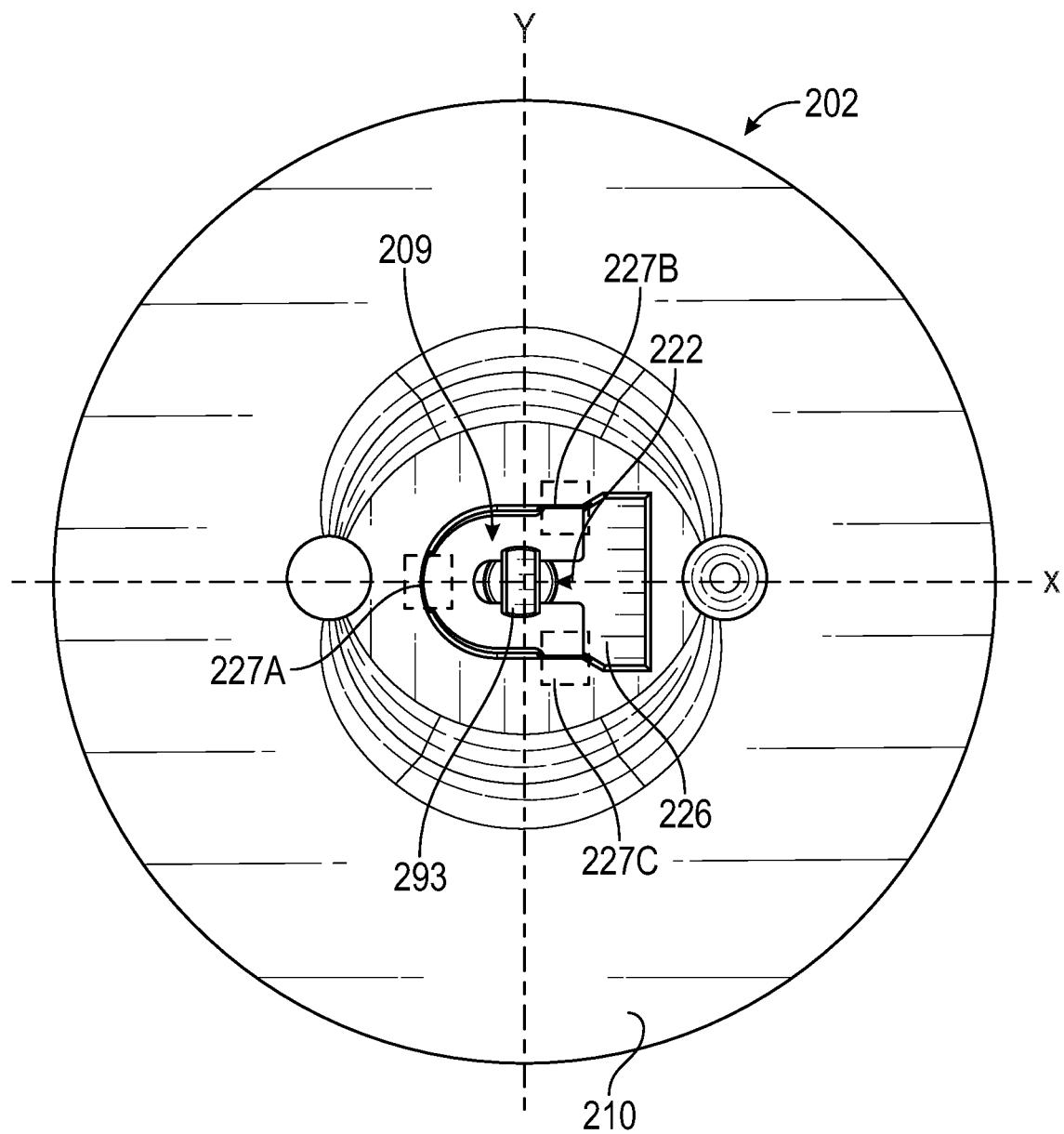
FIG. 73 is a bottom view of the housing showing the clip engaged within the clip recess and the turnkey engaged in the fully latched position.

In one method of latching the rotary closure 200 together into an assembled state, and as illustrated in FIGS. 69-73, a user inserts the turnkey element 291 of the turnkey 206 through the housing keyway 213, the spool keyway 235, the snap spring keyway 258 and the dial keyway 279 of the rotary closure 200 formed by alignment of the housing 102, the spool 103, the snap spring assembly 104, and the dial 105 shown in FIG. 36. As noted above, once the turnkey element 291 is fully inserted through the housing keyway 213, the spool keyway 235, the snap spring keyway 258 and the dial keyway 279, a tool (not shown) is engaged with the gripping recesses 298 of the top surface 299 and rotated 90 degrees such that the dual tab 293 concurrently rotates 90 degrees and the first upper surface 289A and the second upper surface 289B of the dual tab 293 ride over the clip 209 such that the first upper surface 289A and the second upper surface 289B of the dual tab 293 contact the first surface 220 or the second surface 221 of the clip 209 until the turnkey 206 assumes a latched position and cannot be disengaged from the clip slot 222 or the housing keyway 213 without manual intervention. In other embodiments, the turnkey 206 may be rotated by insertion of a tool (not shown) into a cover recess 290A, shown in FIGS. 35-37 and 41, where the cover element 290 is itself engaged with the gripping recesses 298 of the top surface 299 of the turnkey 206. To unlock the turnkey 206, the cover element 209 or the turnkey 206 is rotated 90 degrees in the opposite rotational direction until the first upper surface 289A and the second upper surface 289B of the dual tab 293 ride back over the body of the clip 209 and become disengaged from the clip 209 such that the turnkey 206 assumes an unlatched position for unlatching the assembled components of the rotary closure 200. FIG. 69 illustrates the dual tab 293 of the turnkey 206 in an unlatched position wherein the turnkey element 291 has been fully inserted through the housing keyway 213, the spool keyway 235, the snap spring keyway 258 and the dial keyway 279, but does not contact with the clip 209. FIG. 70 illustrates the dual tab 293 of the turnkey 206 being rotated in the clockwise or counterclockwise direction Z from axis X to axis Y wherein the first upper surface 289A and the second upper surface 289B of the dual tab 293 ride over the clip 209. FIGS. 71-73 illustrate the dual tab 293 of the turnkey 206 in a latched position wherein the dual tab 293 and the entirety of the dual tab 293 is in full engagement with the clip 209 such that the rotary closure 200 is in the latched position and cannot be pulled out of the clip slot 222 or the housing keyway 113 without manual intervention.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A rotary closure, comprising:
 a plurality of components, the plurality of components defining a plurality of respective keyways, wherein the plurality of components comprises a distal-most component, wherein the distal-most component defines a distal-most keyway of the plurality of respective keyways; and
 a turnkey element having an axial portion terminating in a tab;
 wherein the distal-most keyway comprises:
  a lateral keyway portion in communication with the distal-most keyway; and
  a ramp, wherein the ramp defines a raised edge terminating in a pocket;
 wherein the turnkey element is disposed through the plurality of respective keyways of the plurality of components such that the tab extends outwardly from the distal-most keyway and is engaged within the pocket to place the turnkey element in a latched position relative to the plurality of components.

2. The rotary closure of claim 1, wherein the distal-most component comprises a housing and the other plurality of components comprises:
- a dial engaged to the housing, wherein the dial comprises a dial keyway;
- a snap spring assembly disposed within the housing, wherein the snap spring assembly comprises a snap spring keyway; and
- a spool in operative engagement with the snap spring assembly, wherein the spool comprises a spool keyway.

3. The rotary closure of claim 2, wherein assembly of the dial, the snap spring assembly, the spool, and the housing in the latched position axially align the plurality of respective keyways.

4. The rotary closure of claim 3, wherein the axial portion of the turnkey is inserted through the axially aligned plurality of respective keyways and wherein the tab extends beyond the lateral keyway portion of the distal-most keyway when in the latched position.

5. The rotary closure of claim 1, wherein the tab extends laterally in perpendicular relation to the axial portion of the turnkey element.

6. The rotary closure of claim 1, wherein the turnkey element is inserted through the lateral keyway portion of the distal-most keyway and wherein the turnkey element is rotated in a clockwise or counterclockwise direction such that the tab is guided over the raised edge of the ramp and becomes seated within the pocket.

7. The rotary closure of claim 1, wherein the turnkey element is comprised of a flexible material such that the tab of the turnkey element flexes as the tab rides over the raised edge of the ramp and becomes seated within the pocket.

8. A method for assembling a rotary closure, comprising:
assembling a plurality of components of a rotary closure, the assembled plurality of components defining a plurality of axially aligned keyways, wherein the plurality of components comprises a distal-most component, wherein the distal most component defines a distal-most keyway of the plurality of axially aligned keyways;
inserting a turnkey element having a tab through the plurality of aligned keyways such that the tab extends through a lateral keyway portion of the distal-most keyway; and
rotating the turnkey element such that the tab is guided over a raised edge of a ramp of the distal-most keyway and becomes seated within a pocket of the distal-most keyway in a snap-fit engagement, wherein the pocket is configured to prevent disengagement of the tab without manual intervention.

9. The method of claim 8, further comprising:
engaging a cover element with the turnkey element, wherein the cover element comprises one or more recesses configured for engagement with a tool, wherein rotation of the cover element by the tool rotates the turnkey element.

10. The method of claim 8, wherein the plurality of components comprise a spool, a snap spring assembly and a dial, and wherein the spool is engaged with the snap spring assembly, and wherein the spool and the snap spring assembly are disposed within an enclosure formed by the dial and a housing, wherein the housing is the distal-most component.

* * * * *